US012640803B2

(12) United States Patent
Abedini et al.

(10) Patent No.: US 12,640,803 B2
(45) Date of Patent: May 26, 2026

(54) TECHNIQUES FOR FORWARDING A WIRELESS SIGNAL USING A DIGITAL REPEATER

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/305,989

(22) Filed: Jul. 19, 2021

(65) Prior Publication Data

US 2022/0045742 A1    Feb. 10, 2022

Related U.S. Application Data

(60) Provisional application No. 62/706,186, filed on Aug. 4, 2020.

(51) Int. Cl.
| | |
|---|---|
| *H04B 7/155* | (2006.01) |
| *H04W 72/0453* | (2023.01) |
| *H04W 76/12* | (2018.01) |

(52) U.S. Cl.
CPC ........ *H04B 7/155* (2013.01); *H04W 72/0453* (2013.01); *H04W 76/12* (2018.02)

(58) Field of Classification Search
CPC .. H04B 7/155; H04B 7/0617; H04B 7/15528; H04W 72/0453; H04W 76/12
See application file for complete search history.

(56) References Cited

U.S. PATENT DOCUMENTS

| | | | | |
|---|---|---|---|---|
| 6,697,603 | B1 * | 2/2004 | Lovinggood | ...... H04B 7/15528 455/12.1 |
| 8,611,333 | B2 * | 12/2013 | Ji | ......................... H04B 7/2606 455/436 |
| 2008/0311848 | A1 | 12/2008 | Proctor, Jr. et al. | |
| 2009/0088071 | A1 * | 4/2009 | Rofougaran | ....... H04B 7/15535 455/13.1 |

(Continued)

FOREIGN PATENT DOCUMENTS

EP         1109332  A2     6/2001

OTHER PUBLICATIONS

International Search Report and Written Opinion—PCT/US2021/070911—ISA/EPO—Oct. 29, 2021.

*Primary Examiner* — Noel R Beharry
*Assistant Examiner* — Angelie T Ngo
(74) *Attorney, Agent, or Firm* — Harrity & Harrity LLP/Qualcomm Incorporated

(57)         ABSTRACT

Various aspects of the present disclosure generally relate to wireless communication. In some aspects, a digital repeater may receive, using a control component of the digital repeater, a configuration that indicates a digital processing operation, wherein the control component receives the configuration from a control node via a wireless control interface; receive a first signal; perform, using a repeating component of the digital repeater, the digital processing operation on the first signal to generate a second signal, wherein the second signal comprises a re-generated version of the first signal; and transmit the second signal. Numerous other aspects are provided.

30 Claims, 12 Drawing Sheets

400 ⟶

(56)        References Cited

U.S. PATENT DOCUMENTS

| | | | |
|---|---|---|---|
| 2010/0302993 A1* | 12/2010 | Robertson | H04B 7/2606 370/315 |
| 2013/0294331 A1* | 11/2013 | Wang | H04B 7/2606 370/315 |
| 2014/0133367 A1* | 5/2014 | Chen | H04L 5/16 370/279 |
| 2016/0345312 A1* | 11/2016 | Kim | H04W 72/0446 |
| 2017/0347338 A1* | 11/2017 | Chen | H04W 72/30 |
| 2019/0070291 A1* | 3/2019 | Mass | G01N 33/57415 |
| 2019/0074857 A1* | 3/2019 | Kolanski | H04B 1/3877 |
| 2019/0081696 A1* | 3/2019 | Kalhan | H04L 5/0048 |
| 2019/0115972 A1* | 4/2019 | Braun | H04W 24/04 |
| 2019/0139695 A1* | 5/2019 | Venkatadri | H01F 27/32 |
| 2020/0195310 A1 | 6/2020 | Abedini et al. | |
| 2020/0403689 A1* | 12/2020 | Rofougaran | H04W 52/367 |
| 2021/0409106 A1* | 12/2021 | Ashworth | H04B 7/15535 |
| 2022/0045745 A1* | 2/2022 | Abedini | H04B 7/0617 |
| 2022/0103242 A1* | 3/2022 | Teranishi | H04M 11/00 |
| 2022/0369309 A1* | 11/2022 | Li | H04W 72/27 |
| 2023/0072278 A1* | 3/2023 | Shima | H04B 7/155 |
| 2023/0076450 A1* | 3/2023 | Liu | H04W 72/0446 |

* cited by examiner

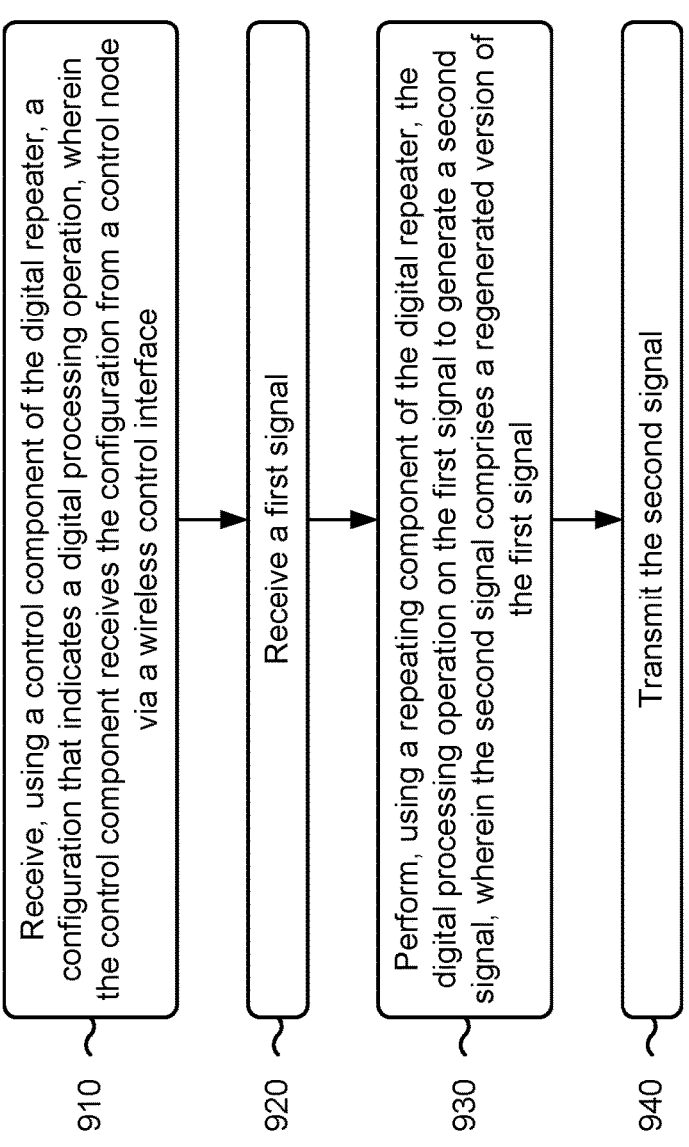

910 — Receive, using a control component of the digital repeater, a configuration that indicates a digital processing operation, wherein the control component receives the configuration from a control node via a wireless control interface 920 — Receive a first signal 930 — Perform, using a repeating component of the digital repeater, the digital processing operation on the first signal to generate a second signal, wherein the second signal comprises a regenerated version of the first signal 940 — Transmit the second signal

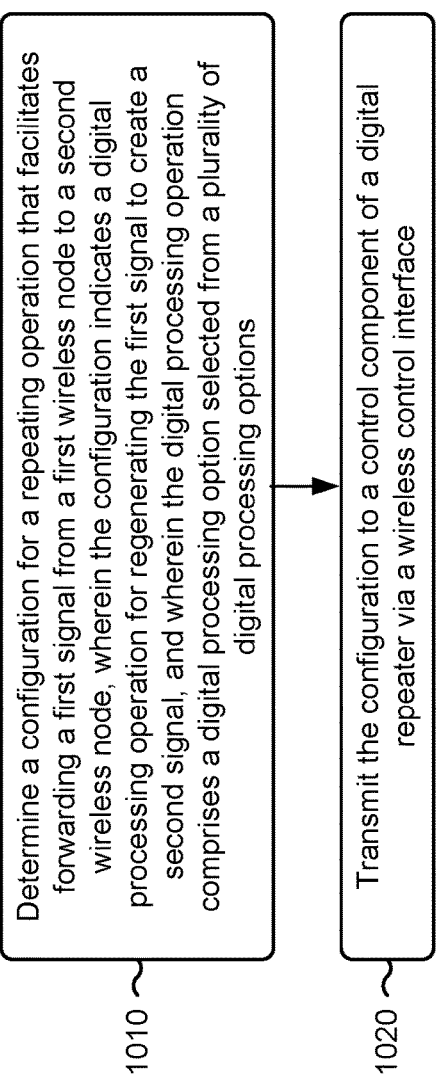

1010

Determine a configuration for a repeating operation that facilitates forwarding a first signal from a first wireless node to a second wireless node, wherein the configuration indicates a digital processing operation for regenerating the first signal to create a second signal, and wherein the digital processing operation comprises a digital processing option selected from a plurality of digital processing options

1020

Transmit the configuration to a control component of a digital repeater via a wireless control interface

TECHNIQUES FOR FORWARDING A WIRELESS SIGNAL USING A DIGITAL REPEATER

CROSS-REFERENCE TO RELATED APPLICATION

This patent application claims priority to U.S. Provisional Patent Application No. 62/706,186, filed on Aug. 4, 2020, entitled "TECHNIQUES FOR FORWARDING A WIRELESS SIGNAL USING A DIGITAL REPEATER," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for forwarding a wireless signal using a digital repeater.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Aspects generally include a method of wireless communication performed by a digital repeater includes: receiving, using a control component of the digital repeater, a configuration that indicates a digital processing operation, wherein the control component receives the configuration from a control node via a wireless control interface; receiving a first signal; performing, using a repeating component of the digital repeater, the digital processing operation on the first signal to generate a second signal, wherein the second signal comprises a re-generated version of the first signal; and transmitting the second signal.

In some aspects, receiving the first signal comprises receiving a millimeter wave wireless signal.

In some aspects, the configuration indicates a beamforming configuration for at least one of receiving the first signal or transmitting the second signal.

In some aspects, performing the digital processing operation comprises: obtaining a plurality of digital samples from the first signal; storing the plurality of digital samples; and extracting a plurality of tones from the plurality of digital samples.

In some aspects, the wireless control interface comprises an in-band control interface.

In some aspects, the first signal is received using a frequency, and control messages are received via the in-band control interface using the frequency.

In some aspects, the method includes transmitting at least one control message to the control node, wherein the at least one control message indicates at least one of: a configuration of the digital repeater, a capability of the digital repeater, or a status of the digital repeater.

In some aspects, the method includes establishing, using the control component and a frequency, an access link to the control node.

In some aspects, the method includes receiving a bandwidth part (BWP) configuration that indicates a BWP corresponding to the wireless control interface.

In some aspects, the configuration is carried by a control message comprising at least one of: downlink control information (DCI), a radio resource control (RRC) message, or a medium access control (MAC) control element (MAC-CE).

In some aspects, the configuration is carried in a front haul physical downlink control channel (FH-PDCCH) control message.

In some aspects, the FH-PDCCH control message comprises downlink control information scrambled by a front haul radio network temporary identifier (FH-RNTI), and the FH-RNTI is associated with the control component.

In some aspects, the wireless control interface comprises an out-of-band control interface.

In some aspects, the first signal is received using a first frequency, and control messages are received via the control interface using a second frequency that is different than the first frequency.

In some aspects, the second frequency is lower than the first frequency.

In some aspects, the control component is based at least in part on a Long Term Evolution (LTE) narrow band Internet-of-Things (IoT) user equipment (UE).

In some aspects, the control component is based at least in part on a New Radio (NR) sub-6 reduced capability UE.

In some aspects, the control component is based on a UE specification that specifies a plurality of functions supported by the UE, and the control component does not support all of the plurality of functions.

In some aspects, the first signal is received using a first radio access technology (RAT), and control messages are received via the control interface using a second RAT that is different than the first RAT.

In some aspects, the configuration is carried in a control message comprising at least one of: a lower-layer control message, an upper-layer control message, or an application-layer control message.

In some aspects, the method includes receiving, from the control node, a control message that indicates at least one of: a reception beamforming configuration associated with the first signal, a reception time domain resource associated with the first signal, a transmission beamforming configuration associated with transmitting the second signal, or a transmission time domain resource associated with transmitting the second signal.

In some aspects, the reception beamforming configuration indicates an index associated with a beamforming codebook.

In some aspects, the reception beamforming configuration indicates at least one of: a phase setting of an antenna element of the digital repeater, or an amplitude setting of the antenna element of the digital repeater.

In some aspects, the method includes transmitting a control message to the control node, wherein the control message indicates a beamforming capability of the digital repeater, and wherein the reception beamforming configuration is based at least in part on the beamforming capability.

In some aspects, the transmission time domain resource is indicated relative to the reception time domain resource.

In some aspects, the transmission time domain resource is based at least in part on a synchronization characteristic corresponding to a synchronization mode between the digital repeater and the control node.

In some aspects, the synchronization characteristic indicates a synchronous mode between the digital repeater and the control node, and the transmission time domain resource is based at least in part on an indication of the reception time domain resource, wherein the indication of the reception time domain resource indicates at least one of: a symbol identifier, a slot identifier, or a frame identifier.

In some aspects, the synchronization characteristic indicates an asynchronous mode between the digital repeater and the control node, and the transmission time domain resource is based at least in part on an indication of a reference time domain resource, wherein the indication of the reference time domain resource indicates at least one of: a symbol identifier, a slot identifier, or a frame identifier.

In some aspects, the method includes transmitting, using the control component, an additional control message to the control node, wherein the reference time domain resource corresponds to the additional control message.

In some aspects, the synchronization characteristic indicates an out-of-sync synchronization mode between the digital repeater and the control node, and the transmission time domain resource is based at least in part on a reference time domain resource, wherein the reference time domain resource corresponds to the configuration.

In some aspects, the method includes transmitting a control message to the control node, wherein the control message includes one or more information elements (IEs), the one or more IEs indicating at least one of: an operation supported by the digital repeater, a beamforming codebook characteristic, a beamforming capability, a transmitter power configuration, a timing configuration, a buffer status, an analog-to-digital converter (ADC) configuration, an ADC setting, a digital-to-analog converter (DAC) configuration, a DAC setting, an in-phase and quadrature (IQ) sample compression capability, an IQ sample decompression capability, an IQ sample compression setting, or an IQ sample decompression setting.

In some aspects, the beamforming codebook characteristic indicates at least one of: a number of transmitter beams available, a number of receiver beams available, a spatial quasi co-location characteristic associated with a beam, a number of antenna arrays, a number of antenna panels, an association between a beam and an antenna array, or an association between a beam and an antenna panel.

In some aspects, the transmitter power configuration indicates at least one of: a power headroom, a maximum transmitter power, a maximum gain level, a current gain setting, or a current transmitter power.

In some aspects, the timing configuration indicates at least one of: a level of synchronization between the digital repeater and the control node, a synchronous operation supported by the digital repeater, or an asynchronous operation supported by the digital repeater.

In some aspects, the buffer status indicates at least one of: an available memory, a maximum buffer size, or a buffer overflow.

In some aspects, the first signal comprises at least one of: a physical downlink control channel (PDCCH) transmission, a physical downlink shared channel (PDSCH) transmission, a physical uplink control channel (PUCCH) transmission, a physical uplink shared channel (PUSCH) transmission, or an acknowledgement or negative acknowledgement (ACK/NACK) feedback message.

In some aspects, the digital processing operation comprises a digital processing option selected from a plurality of digital processing options.

In some aspects, the digital processing option is based at least in part on at least one of: time domain IQ sample buffering, tone extraction, resource element extraction, channel estimation and equalization, or decoding the first signal.

In some aspects, the configuration comprises at least one control IE, the at least one control IE indicating: a reception configuration, a buffering configuration, a forwarding configuration, or an information request.

In some aspects, the reception configuration indicates at least one of: a reception analog beamforming configuration, a time domain resource associated with the first signal, a frequency domain resource associated with the first signal, a numerology associated with the first signal, a digital receiver beamforming configuration, resource element (RE) mapping information associated with the first signal, a channel estimation configuration, a scrambling identifier associated with the first signal, or a coding configuration associated with the first signal.

In some aspects, the frequency domain resource associated with the first signal comprises at least one of: a center frequency, a bandwidth, or a bandwidth part.

In some aspects, the numerology associated with the first signal comprises at least one of: a cyclic prefix (CP) size, a subcarrier spacing (SCS), or a fast Fourier transform (FFT) size.

In some aspects, the RE mapping information associated with the first signal comprises a plurality of indices corresponding to a plurality of occupied tones associated with the first signal.

In some aspects, the channel estimation configuration indicates at least one of: a resource associated with a reference signal, or a configuration associated with the reference signal.

In some aspects, the coding configuration indicates at least one of: a modulation and coding scheme (MCS), or a coding technique.

In some aspects, the buffering configuration indicates at least one of: an ADC setting, a DAC setting, an IQ sample compression setting, or an IQ sample decompression setting.

In some aspects, the ADC setting comprises at least one of: an ADC resolution, or a sample rate.

In some aspects, the forwarding configuration comprises at least one of: a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, or a coding configuration associated with transmitting the second signal.

In some aspects, the numerology associated with forwarding the first signal comprises at least one of: a CP size, an SCS, or an FFT size.

In some aspects, the RE mapping information associated with forwarding the first signal comprises a plurality of indices corresponding to a plurality of occupied tones associated with transmitting the second signal.

In some aspects, the information request comprises a request for at least one of: a buffer status, a power status, a measurement report, a capability of the digital repeater, or a configuration of the digital repeater.

In some aspects, the request for the power status comprises a request for a power headroom of the digital repeater.

In some aspects, the request for the measurement report comprises a request for a signal quality measurement.

In some aspects, the method includes transmitting a periodic report to the control node, wherein the periodic report indicates at least one of: a capability of the digital repeater, or a configuration of the digital repeater.

In some aspects, a method of wireless communication performed by a control node includes: determining a configuration for a repeating operation that facilitates forwarding a first signal from a first wireless node to a second wireless node, wherein the configuration indicates a digital processing operation for regenerating the first signal to create a second signal, and wherein the digital processing operation comprises a digital processing option selected from a plurality of digital processing options; and transmitting the configuration to a control component of a digital repeater via a wireless control interface.

In some aspects, the first signal comprises a millimeter wave wireless signal.

In some aspects, the configuration indicates a beamforming configuration for at least one of receiving the first signal or transmitting the second signal.

In some aspects, the digital processing operation is configured to facilitate extraction of a plurality of tones from the first signal.

In some aspects, the wireless control interface comprises an in-band control interface.

In some aspects, the method includes receiving at least one control message from the digital repeater, wherein the at least one control message indicates at least one of: a configuration of the digital repeater, a capability of the digital repeater, or a status of the digital repeater.

In some aspects, the method includes establishing an access link with the control component of the control node.

In some aspects, the method includes transmitting, to the digital repeater, a BWP configuration that indicates a BWP corresponding to the wireless control interface.

In some aspects, the configuration is carried by a control message comprising at least one of: DCI, an RRC message, or a MAC-CE.

In some aspects, the configuration is carried in an FH-PDCCH control message.

In some aspects, the FH-PDCCH control message comprises downlink control information scrambled by an FH-RNTI, the FH-RNTI is associated with the control component.

In some aspects, the wireless control interface comprises an out-of-band control interface.

In some aspects, the control component is based at least in part on an LTE narrow band IoT UE.

In some aspects, the control component is based at least in part on an NR sub-6 reduced capability UE.

In some aspects, the control component is based on a UE specification that specifies a plurality of functions supported by the UE, and the control component does not support all of the plurality of functions.

In some aspects, the configuration is carried in a control message comprising at least one of: a lower-layer control message, an upper-layer control message, or an application-layer control message.

In some aspects, the method includes transmitting, to the digital repeater, a control message that indicates at least one of: a reception beamforming configuration associated with the first signal, a reception time domain resource associated with the first signal, a transmission beamforming configuration associated with transmitting the second signal, or a transmission time domain resource associated with transmitting the second signal.

In some aspects, the reception beamforming configuration indicates an index associated with a beamforming codebook.

In some aspects, the reception beamforming configuration indicates at least one of: a phase setting of an antenna element of the digital repeater, or an amplitude setting of the antenna element of the digital repeater.

In some aspects, the method includes receiving a control message from the digital repeater, wherein the control message indicates a beamforming capability of the digital repeater, and wherein the reception beamforming configuration is based at least in part on the beamforming capability.

In some aspects, the transmission time domain resource is indicated relative to the reception time domain resource.

In some aspects, the transmission time domain resource is based at least in part on a synchronization characteristic corresponding to a synchronization mode between the digital repeater and the control node.

In some aspects, the synchronization characteristic indicates a synchronous mode between the digital repeater and the control node, and the transmission time domain resource is based at least in part on an indication of the reception time domain resource, wherein the indication of the reception time domain resource indicates at least one of: a symbol identifier, a slot identifier, or a frame identifier.

In some aspects, the synchronization characteristic indicates an asynchronous mode between the digital repeater and the control node, and the transmission time domain resource is based at least in part on an indication of a reference time domain resource, wherein the indication of the reference time domain resource indicates at least one of: a symbol identifier, a slot identifier, or a frame identifier.

In some aspects, the method includes receiving, from the control component, an additional control message, wherein the reference time domain resource corresponds to the additional control message.

In some aspects, the synchronization characteristic indicates an out-of-sync synchronization mode between the digital repeater and the control node, and the transmission time domain resource is based at least in part on a reference time domain resource, wherein the reference time domain resource corresponds to the configuration.

In some aspects, the method includes receiving a control message from the digital repeater, wherein the control message includes one or more IEs, the one or more IEs indicating at least one of: an operation supported by the digital repeater, a beamforming codebook characteristic, a beamforming capability, a transmitter power configuration, a timing configuration, a buffer status, an ADC configuration, an ADC setting, a DAC configuration, a DAC setting, an IQ sample compression capability, an IQ sample decompression capability, an IQ sample compression setting, or an IQ sample decompression setting.

In some aspects, the beamforming codebook characteristic indicates at least one of: a number of transmitter beams available, a number of receiver beams available, a spatial quasi co-location characteristic associated with a beam, a number of antenna arrays, a number of antenna panels, an association between a beam and an antenna array, or an association between a beam and an antenna panel.

In some aspects, the transmitter power configuration indicates at least one of: a power headroom, a maximum transmitter power, a maximum gain level, a current gain setting, or a current transmitter power.

In some aspects, the timing configuration indicates at least one of: a level of synchronization between the digital repeater and the control node, a synchronous operation supported by the digital repeater, or an asynchronous operation supported by the digital repeater.

In some aspects, the buffer status indicates at least one of: an available memory, a maximum buffer size, or a buffer overflow.

In some aspects, the first signal comprises at least one of: a PDCCH transmission, a PDSCH transmission, a PUCCH transmission, a PUSCH transmission, or an ACK/NACK feedback message.

In some aspects, the digital processing operation comprises a digital processing option selected from a plurality of digital processing options.

In some aspects, the digital processing option is based at least in part on at least one of: time domain IQ sample buffering, tone extraction, resource element extraction, channel estimation and equalization, or decoding the first signal.

In some aspects, the configuration comprises at least one control IE, the at least one control IE indicating: a reception configuration, a buffering configuration, a forwarding configuration, or an information request.

In some aspects, the reception configuration indicates at least one of: a reception analog beamforming configuration, a time domain resource associated with the first signal, a frequency domain resource associated with the first signal, a numerology associated with the first signal, a digital receiver beamforming configuration, RE mapping information associated with the first signal, a channel estimation configuration, a scrambling identifier associated with the first signal, or a coding configuration associated with the first signal.

In some aspects, the frequency domain resource associated with the first signal comprises at least one of: a center frequency, a bandwidth, or a bandwidth part.

In some aspects, the numerology associated with the first signal comprises at least one of: a CP size, an SCS, or an FFT size.

In some aspects, the RE mapping information associated with the first signal comprises a plurality of indices corresponding to a plurality of occupied tones associated with the first signal.

In some aspects, the channel estimation configuration indicates at least one of: a resource associated with a reference signal, or a configuration associated with the reference signal.

In some aspects, the coding configuration indicates at least one of: a modulation and coding scheme, or a coding technique.

In some aspects, the buffering configuration indicates at least one of: an ADC setting, a DAC setting, an IQ sample compression setting, or an IQ sample decompression setting.

In some aspects, the ADC setting comprises at least one of: an ADC resolution, or a sample rate.

In some aspects, the forwarding configuration comprises at least one of: a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, or a coding configuration associated with transmitting the second signal.

In some aspects, the numerology associated with forwarding the first signal comprises at least one of: a CP size, an SCS, or an FFT size.

In some aspects, the RE mapping information associated with forwarding the first signal comprises a plurality of indices corresponding to a plurality of occupied tones associated with transmitting the second signal.

In some aspects, the information request comprises a request for at least one of: a buffer status, a power status, a measurement report, a capability of the digital repeater, or a configuration of the digital repeater.

In some aspects, the request for the power status comprises a request for a power headroom of the digital repeater.

In some aspects, the request for the measurement report comprises a request for a signal quality measurement.

In some aspects, the method includes receiving a periodic report from the digital repeater, wherein the periodic report indicates at least one of: a capability of the digital repeater, or a configuration of the digital repeater.

In some aspects, the method includes communicating with a wireless node, via the digital repeater, based at least in part on the configuration.

In some aspects, a digital repeater for wireless communication includes a memory and one or more processors coupled to the memory, the memory and the one or more processors configured to: receive, using a control component of the digital repeater, a configuration that indicates a digital processing operation, wherein the control component receives the configuration from a control node via a wireless control interface; receive a first signal; perform, using a repeating component of the digital repeater, the digital processing operation on the first signal to generate a second signal, wherein the second signal comprises a re-generated version of the first signal; and transmit the second signal.

In some aspects, a control node for wireless communication includes a memory and one or more processors coupled to the memory, the memory and the one or more processors configured to: determine a configuration for a repeating operation that facilitates forwarding a first signal from the control node to a wireless node, wherein the configuration indicates a digital processing operation for regenerating the first signal to create a second signal, wherein the digital processing operation comprises a digital processing option selected from a plurality of digital processing options; and transmit the configuration to a control component of a digital repeater via a wireless control interface.

In some aspects, a non-transitory computer-readable medium storing a set of instructions for wireless communication includes one or more instructions that, when executed by one or more processors of a digital repeater, cause the digital repeater to: receive, using a control component of the digital repeater, a configuration that indicates a digital processing operation, wherein the control component receives the configuration from a control node via a wireless control interface; receive a first signal; perform, using a repeating component of the digital repeater, the digital processing operation on the first signal to generate a second signal, wherein the second signal comprises a re-generated version of the first signal; and transmit the second signal.

In some aspects, a non-transitory computer-readable medium storing a set of instructions for wireless communication includes one or more instructions that, when executed by one or more processors of a control node, cause the control node to: determine a configuration for a repeating operation that facilitates forwarding a first signal from the control node to a wireless node, wherein the configuration indicates a digital processing operation for regenerating the first signal to create a second signal, wherein the digital processing operation comprises a digital processing option selected from a plurality of digital processing options; and transmit the configuration to a control component of a digital repeater via a wireless control interface.

In some aspects, an, apparatus for wireless communication includes: means for receiving, using a control component of the apparatus, a configuration that indicates a digital processing operation, wherein the control component receives the configuration from a control node via a wireless control interface; means for receiving a first signal; means for performing, using a repeating component of the apparatus, the digital processing operation on the first signal to generate a second signal, wherein the second signal comprises a re-generated version of the first signal; and means for transmitting the second signal.

In some aspects, an apparatus for wireless communication includes: means for determining a configuration for a repeating operation that facilitates forwarding a first signal from the control node to a wireless node, wherein the configuration indicates a digital processing operation for regenerating the first signal to create a second signal, wherein the digital processing operation comprises a digital processing option selected from a plurality of digital processing options; and means for transmitting the configuration to a control component of a digital repeater via a wireless control interface.

In some aspects, a method, device, apparatus, system, computer program product, non-transitory computer-readable medium, user equipment, base station, node, wireless node, control node, digital repeater, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9 and 10 are diagrams illustrating example processes associated with forwarding a wireless signal using a digital repeater, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
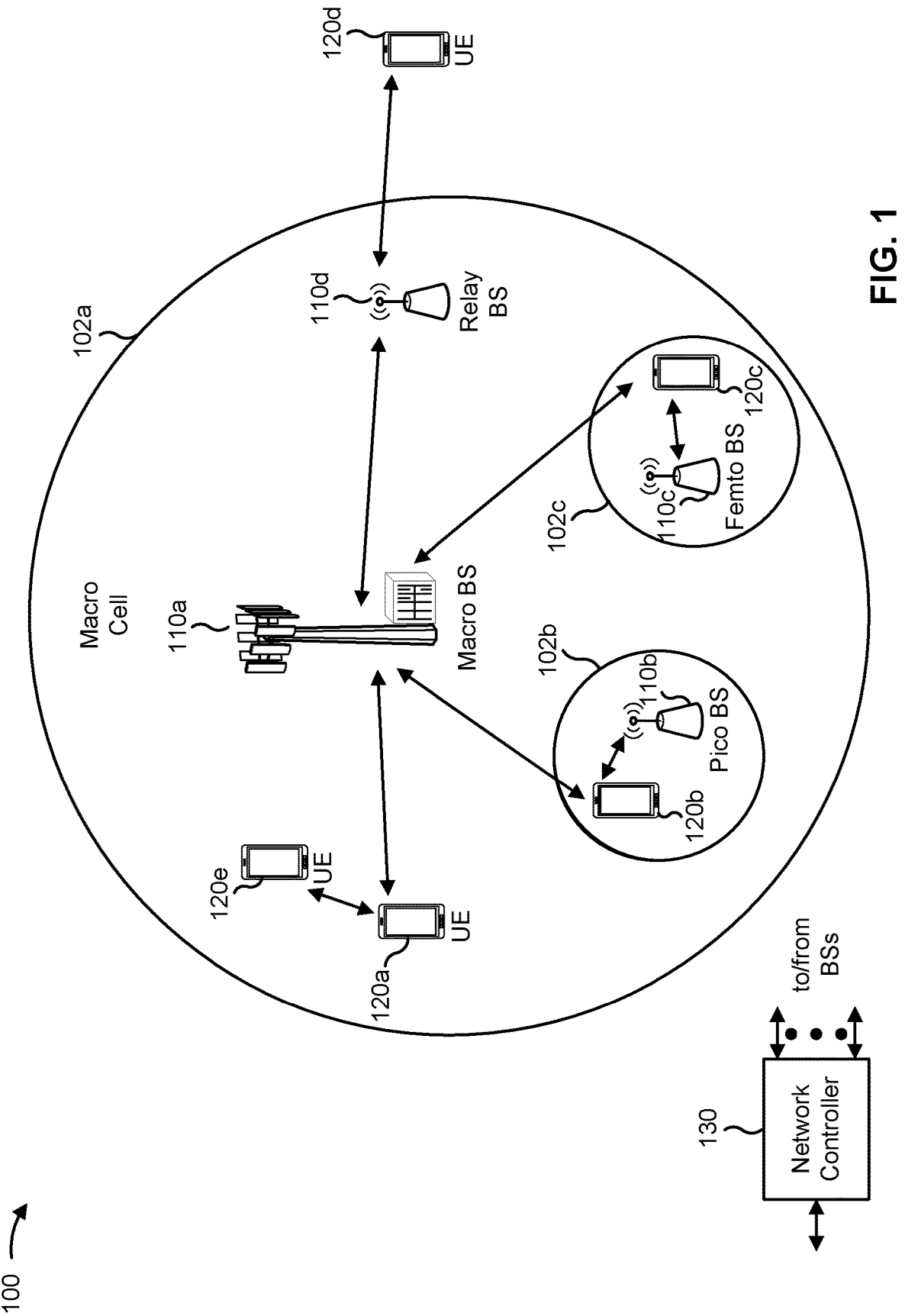
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
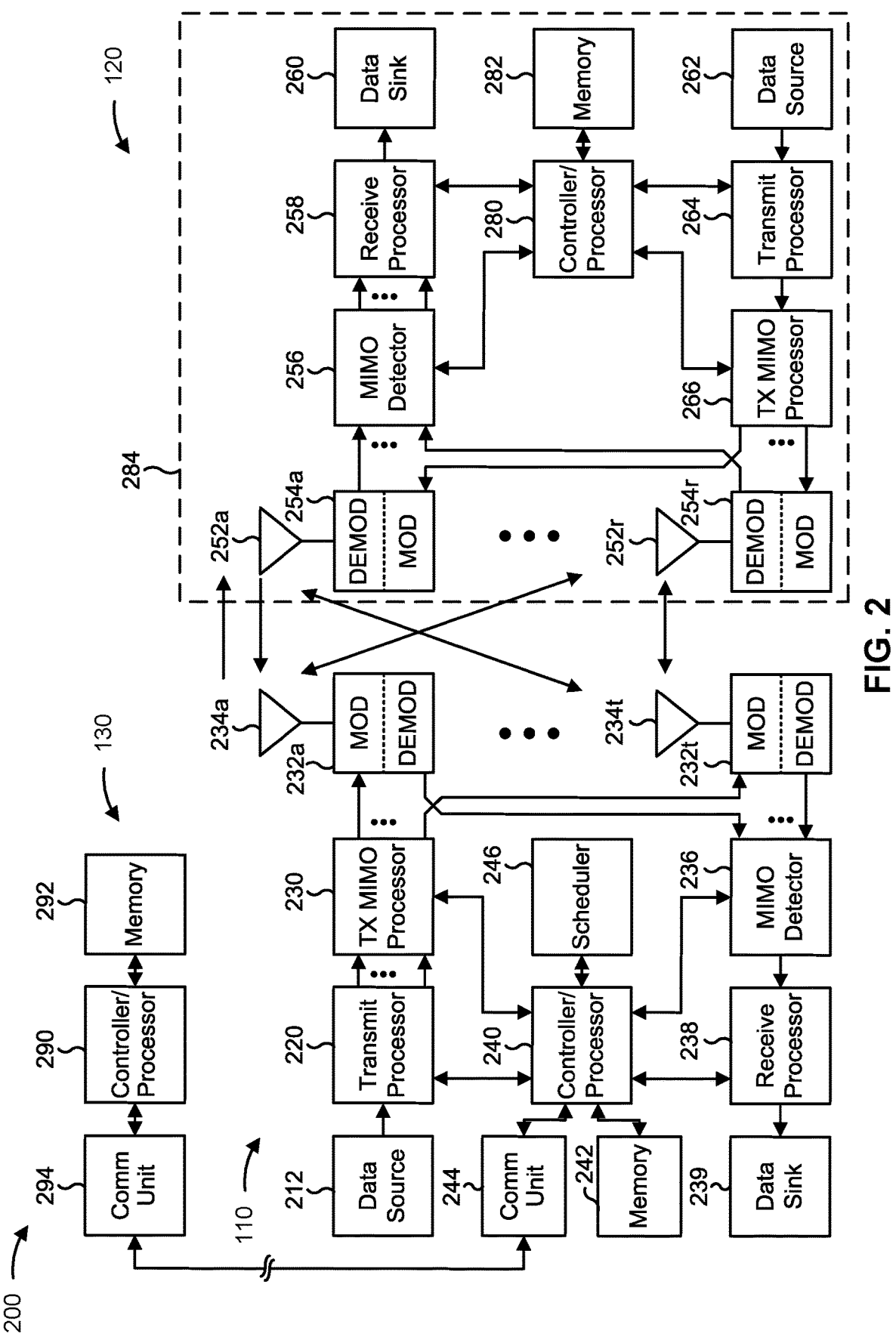
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with forwarding a wireless signal using a digital repeater, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions.

In some aspects, a digital repeater (e.g., a base station 110, a UE 120, a reduced capacity UE, a repeating node, and/or the like) may include means for receiving, using a control component of the digital repeater, a configuration that indicates a digital processing operation, wherein the control component receives the configuration from a control node via a wireless control interface, means for receiving a first signal, means for performing, using a repeating component of the digital repeater, the digital processing operation on the first signal to generate a second signal, wherein the second signal comprises a re-generated version of the first signal, means for transmitting the second signal, and/or the like. In some aspects, such means may include one or more components of base station 110 and/or UE 120 described in connection with FIG. 2, such as controller/processor 240 or 280, transmit processor 220 or 264, TX MIMO processor 230 or 266, MOD 232 or 254, antenna 234 or 252, DEMOD 232 or 254, MIMO detector 236 or 256, receive processor 238 or 258, and/or the like.

In some aspects, a control node (e.g., a base station 110, an integrated access and backhaul (IAB) donor, an IAB node, a UE 120, and/or the like) may include means for transmitting, to an MT function of a digital repeater via a wireless control interface, a configuration that indicates a digital processing operation, means for communicating with the digital repeater based at least in part on the configuration, and/or the like. In some aspects, such means may include one or more components of base station 110 and/or UE 120 described in connection with FIG. 2, such as controller/processor 240 or 280, transmit processor 220 or 264, TX MIMO processor 230 or 266, MOD 232 or 254, antenna 234 or 252, DEMOD 232 or 254, MIMO detector 236 or 256, receive processor 238 or 258, and/or the like.

As indicated above, FIG. 2 is provided as an example. Other examples may differ from what is described with regard to FIG. 2.

Figure 3:
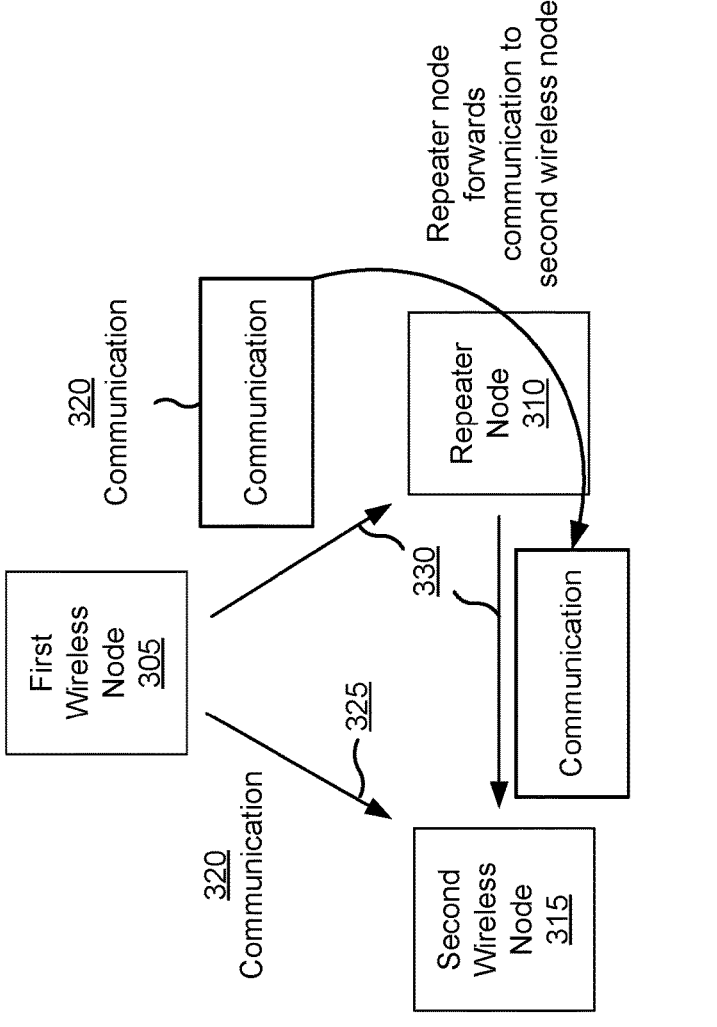
FIG. 3 is a diagram illustrating an example of a repeater node that forwards communications between a first wireless node and a second wireless node, in accordance with the present disclosure.

FIG. 3 is a diagram illustrating an example 300 of a repeater node that forwards communications between a first wireless node and a second wireless node, in accordance with the present disclosure. As shown, example 300 includes a first wireless node 305 (e.g., an integrated access and backhaul (IAB) node, an IAB donor, a base station 110, and UE 120, and/or the like), a repeater node 310 (e.g., a repeater device, a base station 110, a UE 120, a millimeter wave repeater, a digital repeater, an analog repeater, and/or the like), and a second wireless node 315 (e.g., an IAB node, an IAB donor, a base station 110, and UE 120, another repeater node 310, and/or the like). In example 300, the first wireless node 305 and/or the second wireless node 315 may be aware of the repeater node 310. In some aspects, the first wireless node 305 and/or the second wireless node 315 may be unaware of the repeater node 310.

As shown in FIG. 3, the first wireless node 305 may want to transmit a communication 320 (e.g., a data communication, a control communication, and/or the like) to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like. Therefore, the first wireless node 305 may communicate with the second wireless node 315 using an indirect link 330.

For example, the first wireless node 305 may transmit the communication 320 (e.g., as a wireless signal) to the repeater node 310. In some aspects, the first wireless node 305 may transmit the communication 320 directly to the repeater node 310 (e.g., when the first wireless node 305 is aware of the repeater node 310). In some aspects, the repeater node 310 may be configured (e.g., by a control node, by the second wireless node 315, and/or the like) to receive the communication 320 from the first wireless node 305 (e.g., when the first wireless node 305 is unaware of the repeater node 310).

As shown in FIG. 3, the communication 320 may pass through the repeater node 310 and be forwarded by the repeater node 310. For example, the repeater node 310 may receive the wireless signal carrying the communication 320 and may re-generate the wireless signal based at least in part on the communication 320, the wireless signal, an analog processing operation, a digital processing operation, and/or the like. The repeater node 310 may transmit the re-generated version of the wireless signal.

In some cases, an indirect link 330 may be an access link, a side link, or a fronthaul link. For example, if the first wireless node 305 is a base station 110 and the second wireless node 315 is a UE 120, the indirect link 330 between the first wireless node 305 and the repeater node 310 may be a fronthaul link. The indirect link 330 between the repeater node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

In a typical scenario, an analog repeater node may be deployed. The analog repeater node may facilitate an indirect link by forwarding a communication from a first wireless node to a second wireless node. However, an analog repeater node does not store a signal (e.g., a communication). Rather, an analog repeater node simply receives the signal and re-transmits the signal without performing any digital processing on the signal. As a result, an analog repeater node may not provide control over the timing of a re-transmission of a signal, may produce self-interference, and may become unstable. To address these concerns, some repeater nodes may facilitate digitizing a signal and storing the digitized signal so that some control over timing may be provided. In a typical scenario, this digital repeater may be wired (e.g., via ethernet), restricted to repeating communications on a certain protocol layer, and/or the like. As a result, typical analog and digital repeaters may not provide a flexible solution that can be controlled to adapt to various scenarios, channel conditions, and/or the like.

Aspects of techniques and apparatuses described herein provide a digital repeater that may be at least partially controlled by a control node to facilitate forwarding a wireless signal. Some aspects include techniques for facilitating a control interface between a digital repeater and a control node. In some aspects, a control node may transmit, via a control interface, a configuration to the digital repeater. The configuration may indicate a digital processing operation that may include a digital processing option selected from a plurality of digital processing options. The digital repeater may receive a first signal, process the first signal based at least in part on the configured digital processing option, and may transmit a second signal that is a re-generated version of the first signal.

In this way, aspects facilitate providing a digital repeater that may be adapted by a control node to perform a number of different types of digital processing operations. As a result, aspects of techniques and apparatuses described herein may facilitate providing indirect communication links that are more adaptable to channel quality differences, timing issues, traffic conditions, and/or the like, thereby providing more reliable indirect communication links.

As indicated above, FIG. 3 is provided as an example. Other examples may differ from what is described with respect to FIG. 3.

Figure 4:
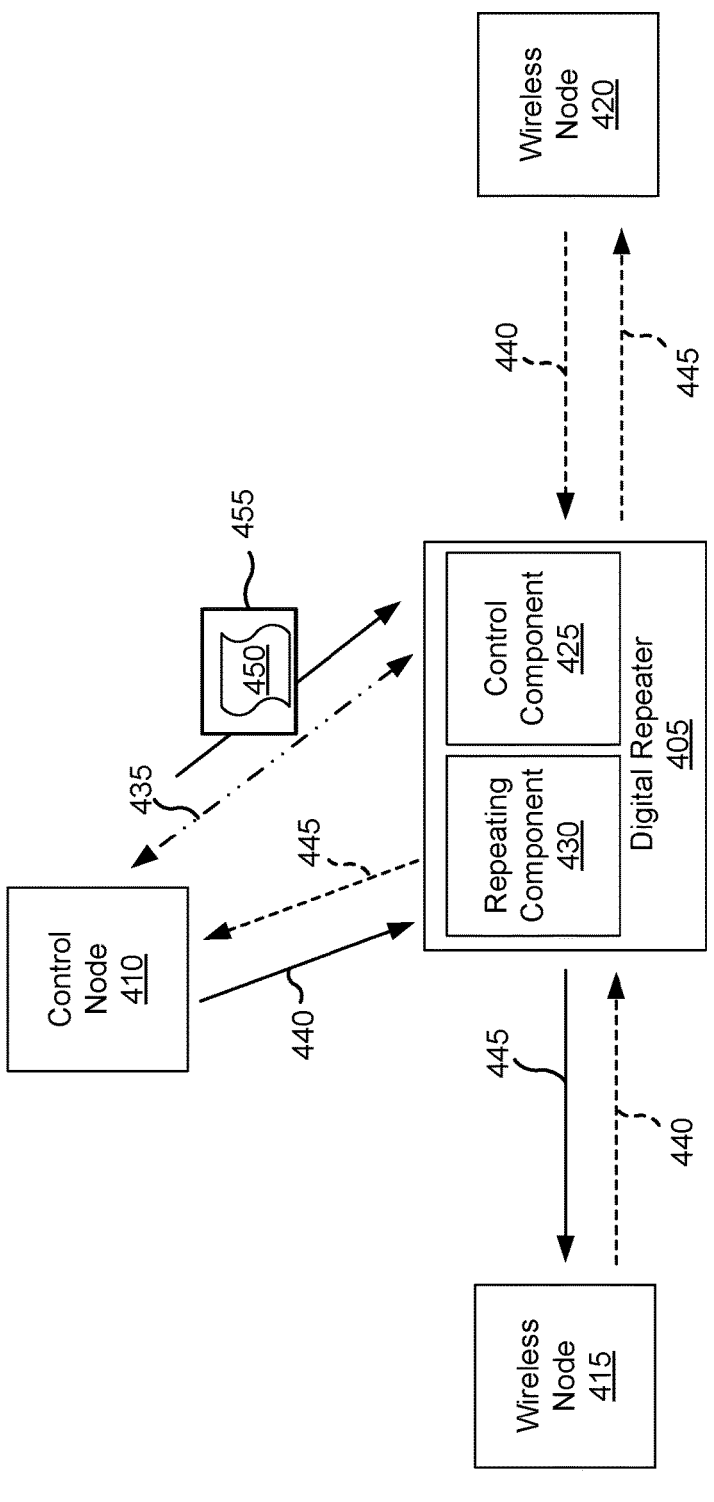
FIGS. 4-8 are diagrams illustrating examples of forwarding a wireless signal using a digital repeater, in accordance with the present disclosure.

FIG. 4 is a diagram illustrating an example 400 associated with forwarding a wireless signal using a digital repeater, in accordance with the present disclosure. As shown, example 400 includes a digital repeater 405 that may communicate with a control node 410, a wireless node 415, and a wireless node 420. In some aspects, the digital repeater 405 may include the repeater node 310 shown in FIG. 3. In some aspects, the control node 410, the wireless node 415, and/or the wireless node 420 may be a wireless node such as, for example, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

In some aspects, the digital repeater 405 may include a millimeter wave repeater that is configured to receive a millimeter wave signal and to transmit a re-generated version of the millimeter wave signal. As shown in FIG. 4, the digital repeater 405 may include a control component 425 and a repeating component 430. In some aspects, the control component 425 may facilitate establishing a wireless control interface 435 between the digital repeater 405 and the control node 410. In some aspects, the control component 425 may include one or more components and/or functions that are, or are similar to, one or more components of a base station (e.g., the base station 110 shown in FIGS. 1 and 2), a UE (e.g., the UE 120 shown in FIGS. 1 and 2), and/or the like. In some aspects, for example, the control component 425 may be based at least in part on an LTE narrow band Internet-of-Things (IoT) UE, an NR sub-6 reduced capability UE, and/or the like. In some aspects, the control component 425 may be based on a UE specification that specifies a plurality of functions supported by a UE, but where the control component 425 does not support all of the plurality of functions.

In some aspects, the repeating component 430 may perform one or more repeating operations. A repeating operation may be a process that includes receiving a first signal 440, performing one or more digital processing operations on the first signal 440 to generate a second signal 445, and transmitting the second signal 445. In some aspects, the first signal 440 may include a communication (e.g., the communication 320 shown in FIG. 3) that is transmitted from the control node 410 and addressed to the wireless node 415. In some aspects, as shown, the first signal 440 may be transmitted from the control node 410 and addressed to the wireless node 420. In some aspects, as shown, the first signal

440 may be transmitted from the wireless node 415 or 420 and addressed to the control node 410. In some aspects, the first signal 440 may be transmitted from the wireless node 415 or 420 and addressed to the control node 410, the other wireless node 415 or 420, and/or the like. In some aspects, the first signal 440 may be addressed to a plurality of wireless nodes (e.g., wireless nodes 415 and 420, control node 410, and/or the like). In some aspects, the first signal 440 may include a physical downlink control channel (PDCCH) transmission, a physical downlink shared channel (PDSCH) transmission, a physical uplink control channel (PUCCH) transmission, a physical uplink shared channel (PUSCH) transmission, a physical random access channel (PRACH) communication, a physical sidelink channel communication, a reference signal (RS) communication, an acknowledgement or negative acknowledgement (ACK/NACK) feedback message, and/or the like.

In some aspects, the repeating component 430 may perform the one or more repeating operations based at least in part on a configuration established using the control component 425. For example, in some aspects, the control node 410 may transmit a configuration 450 using a control message 455, and the digital repeater 405 may receive the control message 455 using the control component 425.

The control node 410 may transmit the configuration 450 in the control message 455 via the control interface 435. The configuration 450 may be carried in at least one control message 455. In some aspects, control messages 455 may be specified for communication between the digital repeater 405 and the control node 410 in accordance with a specification of the control interface 435. In some aspects, the configuration 450 may be carried in a lower-layer control message (e.g., a control message associated with physical layers and/or medium access control (MAC) layers), an upper-layer control message (e.g., a control message associated with network layers), an application-layer control message (e.g., a control message associated with an application layer), and/or the like. For example, a control message 455 may be carried using a radio resource control (RRC) message, downlink control information (DCI), a MAC control element (MAC-CE), and/or the like.

In some aspects, the control interface 435 may be an in-band control interface. For example, in some aspects, the first signal 440 may be transmitted by the control node 410 (and/or the wireless node 415, the wireless node 420, and/or the like) and received by the digital repeater 405 using the same frequency that is used for transmitting and receiving control messages 455. In some aspects, a control message 455 may be included within the first signal 440. In some aspects, the configuration 450 may be included within the first signal 440. In some aspects, the configuration 450 may be carried in a front haul physical downlink control channel (FH-PDCCH) control message (which may be the control message 455). In some aspects, the FH-PDCCH control message may include DCI scrambled by a front haul radio network temporary identifier (FH-RNTI). The FH-RNTI may be associated with the control component. In some aspects, as indicated above, the configuration 450 may be carried in a MAC-CE of a physical downlink shared channel (PDSCH) transmission that is received using the repeating component 430, which may extract the configuration 450 (and/or other control messages, configuration information, and/or the like) and provide the extracted configuration 450 (and/or other control messages, configuration information, and/or the like) to the control component 425.

In some aspects, the control interface 435 may be an out-of-band control interface. For example, in some aspects, the repeating component 430 may receive and/or transmit signals using a first frequency (or range of frequencies), and the control component 425 may receive and/or transmit control messages using a second frequency (or range of frequencies). In some aspects, the second frequency may be lower than the first frequency. That is, for example, in some aspects, the repeating component 430 may communicate using millimeter waves, while the control component 425 may communicate using frequencies that are lower than millimeter wave frequencies. For example, in some aspects, the control component 425 may communicate using sub-6 (sub-6 GHz) frequencies. In some aspects, the control node 410 may transmit, and the digital repeater 405 may receive, a configuration of the control interface 435 or one or more aspects thereof. In some aspects, for example, the control node 410 may transmit a configuration of a frequency, a bandwidth, a bandwidth part (BWP), and/or the like. In some aspects, the repeating component 430 may communicate using a first RAT (e.g., NR) and the control component 425 may communicate using a second RAT (e.g., Bluetooth, WiFi, and/or the like). In some aspects, the control interface 435 may include an access link between the control component 425 and the control node 410.

In some aspects, the configuration 450 may configure any number of different types of settings, configurations, digital processing operations, reception operations, buffering operations, forwarding (transmission) operations, and/or the like. In some aspects, the digital repeater 405 may transmit, and the control node 410 may receive, one or more control messages. For example, in some aspects, the digital repeater 405 may, using the control component 425, transmit a control message via the control interface 435 to the control node. The control message transmitted by the digital repeater 405 may indicate a configuration of the digital repeater 405, a capability of the digital repeater 405, a status of the digital repeater 405, and/or the like.

As indicated above, in some aspects, the control node 410 may configure the digital repeater 405 for a particular repeating operation by transmitting a configuration 450 to the digital repeater. In some aspects, the configuration 450 may indicate a digital processing operation. The digital processing operation may include a digital processing option selected from a plurality of digital processing options (e.g., the digital processing options 525-550 shown in, and described below in connection with, FIG. 5).

In some aspects, the configuration 450 may include one or more information elements (IEs) that indicate a reception configuration, a buffering configuration, a forwarding configuration, an information request, and/or the like.

In some aspects, the reception configuration may be used to configure aspects of a reception operation of the repeating component 430 with respect to receiving the first signal 440. The reception configuration may indicate, for example, a reception analog beamforming configuration, a time domain resource associated with the first signal 440, a frequency domain resource associated with the first signal 440, a numerology associated with the first signal 440, a digital receiver beamforming configuration, resource element (RE) mapping information associated with the first signal 440, a channel estimation configuration, a scrambling identifier associated with the first signal 440, a coding configuration associated with the first signal 440, and/or the like.

In some aspects, the buffering configuration may be used to configure aspects of a buffering operation of the repeating component 430 with respect to buffering a digitized form of the first signal 440. In some aspects, the buffering configuration may indicate an analog-to-digital converter (ADC)

setting, a digital-to-analog converter (DAC) setting, an in-phase and quadrature (IQ) sample compression setting, an IQ sample decompression setting, and/or the like.

In some aspects, the forwarding configuration may be used to configure aspects of a forwarding operation of the repeating component 430 with respect to transmitting the second signal 445, which may be a re-generated form of the first signal 440. In some aspects, the forwarding configuration may include a transmission beamforming configuration, a time domain resource associated with transmitting the second signal 445, a transmission power setting, a transmission amplification setting, a transmission center frequency, a numerology associated with transmitting the second signal 445, a digital transmitter beamforming configuration, RE mapping information associated with transmitting the second signal 445, a layer mapping configuration, a precoding configuration, a scrambling identifier associated with transmitting the second signal 445, a coding configuration associated with transmitting the second signal 445, and/or the like.

In some aspects, the information request may be used to configure aspects of a reporting operation of the repeating component 430 with respect to providing information to the control node 410. The information may include information about the operation of the digital repeater 405, information about the configuration of the digital repeater 405, information about settings of the digital repeater 405, information about a channel, information about a communication, and/or the like. In some aspects, the information request may include a request for a buffer status, a power status, a measurement report, a capability of the digital repeater 405, a configuration of the digital repeater 405, and/or the like.

As indicated above, FIG. 4 is provided as an example. Other examples may differ from what is described with respect to FIG. 4.

Figure 5:
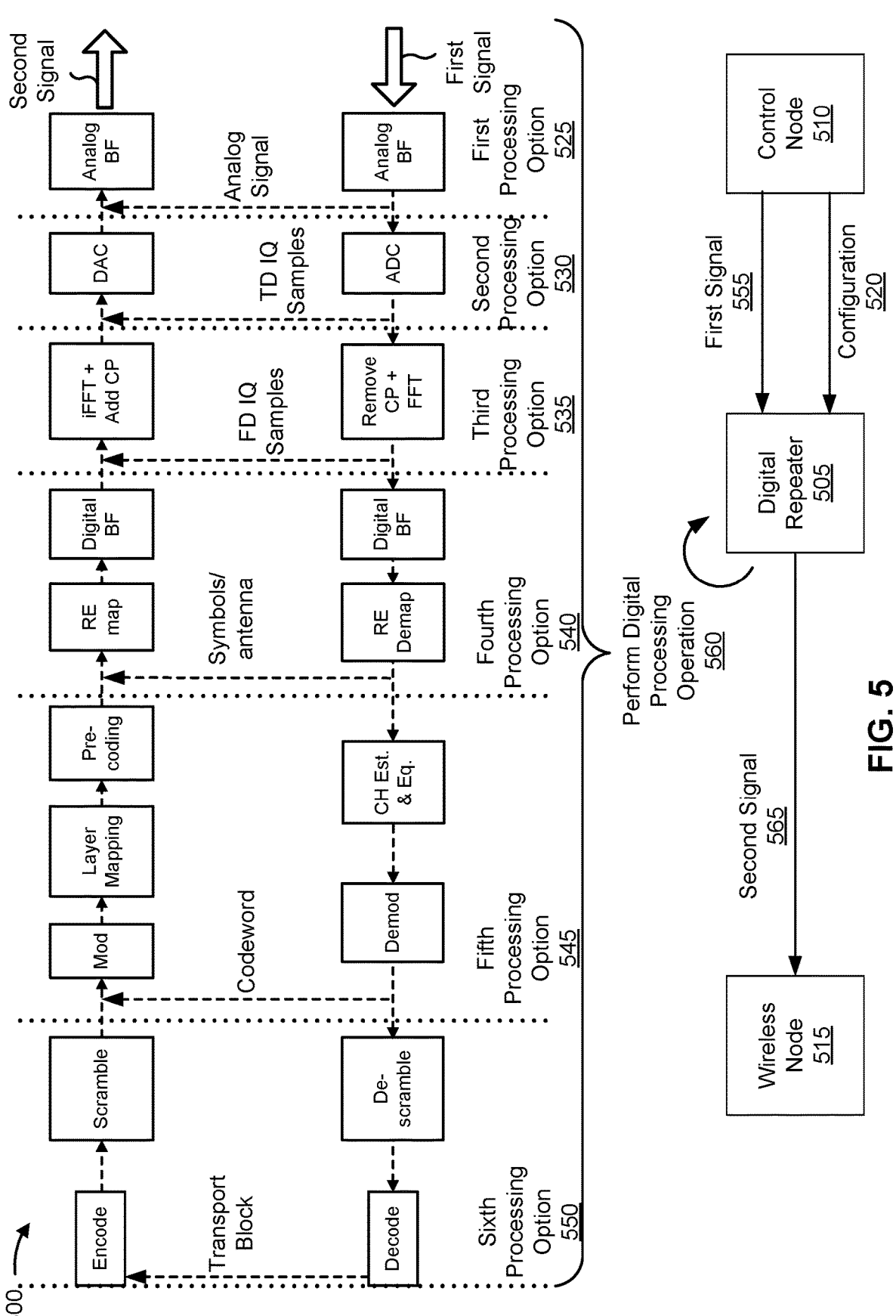

FIG. 5 is a diagram illustrating an example 500 of forwarding a wireless signal using a digital repeater, in accordance with the present disclosure. As shown, the example 500 includes a digital repeater 505 that may communicate with a control node 510 and a wireless node 515. In some aspects, the digital repeater 505 may communicate with one or more additional wireless nodes (not shown).

In some aspects, the digital repeater 505 may include the digital repeater 405 shown in FIG. 4, the repeater node 310 shown in FIG. 3, and/or the like. In some aspects, the control node 510 may include the control node 410 shown in FIG. 4, the first wireless node 305 shown in FIG. 3, the second wireless node 315 shown in FIG. 3, an IAB node, an IAB donor, a base station 110 shown in FIG. 1, a UE 120 shown in FIG. 1, and/or the like. In some aspects, the wireless node 515 may include the wireless node 415 shown in FIG. 4, the wireless node 420 shown in FIG. 4, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

As shown by reference number 520, the control node 510 may transmit, and the digital repeater 505 may receive, a configuration. In some aspects, the configuration may be, be similar to, include, or be included in the configuration 450 shown in FIG. 4. In some aspects, the configuration may be received using a control component (e.g., the control component 425 shown in FIG. 4) of the digital repeater 505 via a control interface (e.g., the control interface 435 shown in FIG. 4). The configuration may indicate a digital processing operation. A digital processing operation may be a repeating operation that at least includes obtaining a plurality of digital samples from a first signal and storing the plurality of digital samples.

A repeating operation may include a repeater receiving a first signal from a first wireless node, processing the signal to generate a second signal, and transmitting the second signal to a second wireless node. In some aspects, processing the first signal may include re-generating the first signal (by generating a re-generated version of the first signal, which may be referred to herein, interchangeably, as a "re-generated signal") based at least in part on the processing of the first signal. In this way, the repeater node may repeat the signal received from the first wireless node to the second wireless node. Transmitting the re-generated signal may be referred to as forwarding the re-generated signal and/or performing a forwarding operation.

As shown in FIG. 5, the processing operation indicated by the configuration may include a processing option selected from a plurality of processing options. The plurality of processing options may include a first processing option 525 (shown as processing blocks and associated intermediate output, "analog signal," to the right of the first dotted vertical line from the right) that may be based at least in part on an analog processing of the received signal. The plurality of processing options may include a second processing option 530 (shown as processing blocks and associated intermediate outputs, "analog signal" and "TD IQ samples," to the right of the second dotted vertical line from the right) that may be based at least in part on determining and buffering time domain (TD) in-phase and quadrature (IQ) samples.

The plurality of processing options may include a third processing option 535 (shown as processing blocks and associated intermediate outputs, "analog signal," "TD IQ samples," and "FD IQ samples," to the right of the third dotted vertical line from the right) that may be based at least in part on tone extraction. The tone extraction may include determining frequency domain (FD) IQ samples. The plurality of processing options may include a fourth processing option 540 (shown as processing blocks and associated intermediate outputs, "analog signal," "TD IQ samples," "FD IQ samples," and "symbols/antenna," to the right of the fourth dotted vertical line from the right) that may be based at least in part on resource element (RE) extraction. Extraction of REs may include determining symbols and antenna elements, antenna configurations, and/or the like.

The plurality of processing options may include a fifth processing option 545 (shown as processing blocks and associated intermediate outputs, "analog signal," "TD IQ samples," "FD IQ samples," "symbols/antenna," and "codeword," to the right of the fifth dotted vertical line from the right) that may be based at least in part on channel estimation and equalization. Equalization of channels associated with extracted REs may be used to determine codewords. The plurality of processing options may include a sixth processing option 550 (shown as processing blocks and associated intermediate outputs, "analog signal," "TD IQ samples," "FD IQ samples," "symbols/antenna," "codeword," and "transport block," to the right of the sixth dotted vertical line from the right) that may be based at least in part on decoding the received signal to determine a transport block.

According to various aspects, the second, third, fourth, fifth, and sixth processing options 530-550 may be referred to as digital processing options since they include processing of digital information. A repeater node that is capable of, and/or configured to, perform only the first processing option may be referred to as an analog repeater. A repeater node that is capable of, and/or configured to, perform any one or more of the second, third, fourth, fifth, or sixth processing options 530-550 may be referred to as a digital repeater (e.g., the digital repeater 505). Thus, the configuration may indicate a digital processing option selected from the second, third, fourth, fifth, and sixth processing options 530-550. In some aspects, the configuration may include information that may be used by the digital repeater 505 to facilitate performing the processing option, as discussed below in connection with the various processing options.

As shown by reference number 555, the control node 510 may transmit, and the digital repeater 505 may receive, a first signal. In some aspects, the first signal may be, be similar to, include, or be included in, the first signal 440 shown in FIG. 4. The first signal may be transmitted by the control node 510, the wireless node 515, or another wireless node not shown in FIG. 5. As shown by reference number 560, the digital repeater 505 may perform a digital processing operation on the first signal to generate a second signal.

In some aspects, the digital repeater 505 may perform the digital processing operation indicated by the configuration. In addition to, or in lieu of, performing a digital procession operation, the digital repeater also may be configured to perform an analog processing operation, indicated as the first processing option 525. In the first processing option 525, the digital repeater 505 may receive the first signal and may perform an analog beamforming procedure to obtain a second analog signal associated with the first signal. The digital repeater 505 may extract the analog signal and may re-generate the analog signal in a transmit (Tx) chain of the digital repeater 505. For example, the digital repeater 505 may perform an analog beamforming procedure on the analog signal to form the outgoing signal (e.g., the digital repeater 505 may boost the analog signal, apply an analog beamforming gain, and/or the like).

According to some aspects, to support the first processing option 525, the digital repeater 505 may receive, from the control node 510, one or more control messages (e.g., in the configuration shown by reference number 520) that indicate a reception beamforming configuration associated with the first signal, a transmission beamforming configuration associated with transmitting the second signal, and/or the like. In some aspects, the reception beamforming configuration may indicate an index associated with a beamforming codebook. In some aspects, the digital repeater 505 may transmit a control message to the control node 510 that indicates a beamforming codebook characteristic. The beamforming codebook characteristic may indicate, for example, a number of transmitter beams available, a number of receiver beams available, a spatial quasi co-location characteristic associated with a beam, a number of antenna arrays, a number of antenna panels, an association between a beam and an antenna array, an association between a beam and an antenna panel, and/or the like.

In some aspects, the reception beamforming configuration may indicate a phase setting of an antenna element of the digital repeater 505, an amplitude setting of the antenna element of the digital repeater 505, and/or the like. In some aspects, the digital repeater 505 may transmit a control message to the control node 510 that indicates a beamforming capability of the digital repeater, and the reception beamforming configuration may be based at least in part on the beamforming capability.

In some aspects, the digital repeater 505 may transmit a control message to the control node 510 that indicates a transmitter power configuration, and the configuration received from the control node 510 may indicate one or more transmitter power and/or amplification settings based at least in part on the transmitter power configuration. In some aspects, the transmitter power configuration may indicate a power headroom, a maximum transmitter power, a maximum gain level, a current gain setting, a current transmitter power, and/or the like.

In the second processing option 530, in some aspects, the digital repeater 505 may perform digital signal processing (which also includes the first processing option). As shown, after receiving the incoming signal and performing an analog beamforming procedure associated with the incoming signal, the digital repeater 505 may convert the incoming signal from the analog domain to the digital domain using an analog-to-digital converter (ADC). After converting the incoming signal from the analog domain to the digital domain, the digital repeater 505 may determine one or more time domain in-phase and quadrature (IQ) samples (shown as "TD IQ samples") associated with the incoming signal. The digital repeater 505 may extract the time domain IQ samples and may store the time domain IQ samples in a buffer of the repeater node. The digital repeater 505 may use the time domain IQ samples to re-generate the incoming signal in the Tx chain of the digital repeater 505 (e.g., immediately after extracting the time domain IQ samples or at a later time). For example, the digital repeater 505 may convert the time domain IQ samples from the digital domain to the analog domain using a digital-to-analog converter (DAC). The digital repeater 505 may perform an analog beamforming procedure on the analog signal to form the second signal, in accordance with the first processing option 525, before transmitting the second signal to the wireless node 515.

In some aspects, to facilitate performance of the second processing option by the digital repeater 505, the configuration may indicate a reception configuration, a buffering configuration, a forwarding configuration, an information request, and/or the like. In some aspects, for example, the configuration may indicate a timing configuration. The timing configuration may include aspects of the reception configuration, the buffering configuration, the forwarding configuration, and/or the like.

In some aspects, for example, the reception configuration may indicate a reception analog beamforming configuration, a time domain resource associated with the first signal, a frequency domain resource associated with the first signal, and/or the like. In some aspects, the frequency domain resource associated with the first signal may include a center frequency, a bandwidth, a BWP, and/or the like.

In some aspects, the buffering configuration may indicate an ADC setting (e.g., an ADC resolution, sample rate, and/or the like), a DAC setting, an IQ sample compression setting, an IQ sample decompression setting, a buffer status (e.g., an available memory, a maximum buffer size, a buffer overflow, and/or the like), an ADC configuration, a DAC configuration, an IQ capability, an IQ setting, and/or the like.

In some aspects, the forwarding configuration may indicate a transmission beamforming configuration, a time domain resource associated with transmitting the second signal, a transmission power setting, a transmission amplification setting, a transmission center frequency, and/or the like. In some aspects, the transmission time domain resource may be indicated relative to the reception time domain resource. The transmission time domain resource may be based at least in part on a synchronization characteristic corresponding to a synchronization mode between the digital repeater and the control node. For example, the synchronization characteristic may indicate a synchronous mode between the digital repeater and the control node, and the transmission time domain resource may be based at least in part on an indication (e.g., a symbol identifier, a slot identifier, a frame identifier, and/or the like) of the reception time domain resource.

In some aspects, the synchronization characteristic may indicate an asynchronous mode between the digital repeater and the control node, and the transmission time domain resource may be based at least in part on an indication (e.g., a symbol identifier, a slot identifier, a frame identifier, and/or the like) of a reference time domain resource. In some aspects, the digital repeater may transmit, using the control component, an additional control message to the control node, and the reference time domain resource may correspond to the additional control message In some aspects, the synchronization characteristic may indicate an out-of-sync synchronization mode between the digital repeater and the control node, and the transmission time domain resource may be based at least in part on a reference time domain resource that corresponds to the configuration (e.g., a time associated with transmission or receipt of a control message containing at least a portion of the configuration).

In some aspects, the information request may include a request for a buffer status, a power status, a measurement report, a capability of the digital repeater, a configuration of the digital repeater, and/or the like. In some aspects, the request for the power status may include, for example, a request for a power headroom of the digital repeater 505. In some aspects, the request for the measurement report may include a request for a signal quality measurement. In some aspects, the digital repeater 505 may transmit a periodic report to the control node 510 that indicates a capability of the digital repeater 505, a configuration of the digital repeater 505, signal quality measurements, and/or the like.

In the third processing option 535, in some aspects, the digital repeater 505 may perform further digital processing (which also may include the second processing option and the first processing option). As shown, for example, after converting the incoming signal from the analog domain to the digital domain, the digital repeater 505 may remove a cyclic prefix (CP) associated with the incoming signal and may perform a fast-Fourier transform (FFT) on the incoming signal. Based at least in part on removing the CP and performing the FFT, the digital repeater 505 may determine one or more frequency domain IQ samples (shown as "FD IQ samples") associated with the incoming signal. Frequency domain IQ samples may correspond to tones (e.g., OFDM tones). The digital repeater 505 may extract the frequency domain IQ samples and may store the frequency domain IQ samples in a buffer of the digital repeater 505. The digital repeater 505 may use the frequency domain IQ samples to re-generate the incoming signal in the Tx chain of the digital repeater 505 (e.g., immediately after extracting the frequency domain IQ samples or at a later time). For example, the digital repeater 505 may perform an inverse FFT (iFFT) operation on the frequency domain IQ samples to generate re-generated time domain IQ samples. The digital repeater 505 may add a CP to the re-generated time domain IQ samples. The digital repeater 505 may convert the digital signal (e.g., the re-generated digital samples) from the digital domain to the analog domain using the DAC. The digital repeater 505 may perform an analog beamforming procedure on the analog signal to form the second signal.

In some aspects, to facilitate performance of the third processing option 535 by the digital repeater 505, the configuration may indicate further IEs associated with the reception configuration and/or the transmission configuration. These further IEs may be in addition to IEs described above in connection with the second processing option 530, the first processing option 525, and/or the like.

In some aspects, for example, the reception configuration may indicate a numerology associated with the first signal and the forwarding configuration may indicate a numerology associated with transmitting the second signal. In some aspects, the numerology associated with the first signal may be the same as the numerology associated with transmitting the second signal. In some aspects, the numerology associated with the first signal may be different than the numerology associated with transmitting the second signal. In some aspects, the numerology associated with the first signal and/or the numerology associated with transmitting the second signal may include at least one of a cyclic prefix size, a subcarrier spacing, a fast Fourier transform size, and/or the like.

In the fourth processing option 540, in some aspects, the digital repeater 505 may perform further digital processing (which also may include the third processing option, the second processing option, and the first processing option). In some aspects, in the fourth processing option 540, after removing the CP and performing the FFT associated with the incoming signal, the digital repeater 505 may perform a digital beamforming procedure associated with the incoming signal. The digital repeater 505 may perform an RE de-mapping operation associated with the incoming signal to extract REs based at least in part on the determined tones. After performing the digital beamforming procedure and the RE de-mapping procedure, the digital repeater 505 may determine one or more IQ samples of occupied tones (e.g., a quantity of symbols per antenna element) associated with the incoming signal. The digital repeater 505 may extract the IQ samples of occupied tones and may store the IQ samples of occupied tones in a buffer of the digital repeater 505. The digital repeater 505 may use the IQ samples of occupied tones to re-generate the incoming signal in the Tx chain of the digital repeater 505 (e.g., immediately after extracting the IQ samples of occupied tones or at a later time). For example, the digital repeater 505 may perform an RE mapping procedure (e.g., the inverse of the RE de-mapping procedure) associated with the IQ samples of occupied tones. The digital repeater 505 may perform a digital beamforming procedure associated with the IQ samples of occupied tones. After performing the digital beamforming procedure, the digital repeater 505 may perform an iFFT procedure and add a CP to the signal. As indicated above, the digital repeater 505 may convert the digital signal from the digital domain to the analog domain using the DAC.

In some aspects, to facilitate performance of the fourth processing option 540 by the digital repeater 505, the configuration may indicate further IEs associated with the reception configuration and/or the transmission configuration. These further IEs may be in addition to IEs described above in connection with the third processing option 535, the second processing option 530, the first processing option 525, and/or the like.

In some aspects, for example, the reception configuration may indicate a digital receiver beamforming configuration, and the forwarding configuration may indicate a digital transmitter beamforming configuration. In some aspects, the reception configuration may indicate RE mapping information associated with the first signal, and the forwarding configuration may indicate RE mapping information associated with transmitting the second signal. In some aspects, the RE mapping information associated with the first signal may include a plurality of indices corresponding to a plurality of occupied tones associated with the first signal. In some aspects, the RE mapping information associated with forwarding the first signal may include a plurality of indices corresponding to a plurality of occupied tones associated with transmitting the second signal.

In the fifth processing option 545, in some aspects, the digital repeater 505 may perform further digital processing (which also may include the fourth processing option, the third processing option, the second processing option, and the first processing option). In some aspects, in the fifth processing option 545, after performing the digital beamforming procedure and the RE de-mapping operation, the repeater node may perform channel estimation and equalization associated with the incoming signal (e.g., to determine and/or remove noise and wireless channel variations associated with the incoming signal). For example, the first signal may include a source signal attenuated by a wireless channel characteristic of a wireless channel that carries the first signal. The channel estimation may be performed based at least in part on one or more reference signals transmitted by the control node 510, the wireless node 515, and/or the like. In some aspects, performing the fifth digital processing option 545 may include stabilizing, based at least in part on the channel estimation, the wireless channel characteristic associated with the extracted set of REs (extracted during performance of the fourth processing option 540) to generate a set of stabilized REs. The digital repeater 505 may generate the second signal based at least in part on the stabilized REs.

After performing channel estimation and equalization, the digital repeater 505 may perform a demodulation operation to determine a set of codewords associated with the incoming signal. The digital repeater 505 may extract the codewords and may store the codewords in a buffer of the digital repeater 505. The digital repeater 505 may use the codewords to re-generate the incoming signal in the Tx chain of the digital repeater 505 (e.g., immediately after extracting the codewords or at a later time). For example, the digital repeater 505 may perform a modulation operation, a layer mapping operation, a pre-coding operation, an RE-mapping operation, and/or a digital beamforming procedure associated with the codewords.

In some aspects, to facilitate performance of the fifth processing option 545 by the digital repeater 505, the configuration may indicate further IEs associated with the reception configuration and/or the transmission configuration. These further IEs may be in addition to IEs described above in connection with the fourth processing option 540, the third processing option 535, the second processing option 530, the first processing option 525, and/or the like.

For example, in some aspects, the reception configuration may indicate a channel estimation configuration. In some aspects, the channel estimation configuration may indicate a resource associated with a reference signal, a configuration associated with the reference signal, and/or the like. In some aspects, the forwarding configuration may indicate a layer mapping configuration, a precoding configuration, and/or the like.

In the sixth processing option 550, in some aspects, the digital repeater 505 may perform the sixth digital processing option (which also may include the fifth processing option, the fourth processing option, the third processing option, the second processing option, and the first processing option). In some aspects, in the sixth processing option 550, for example, the digital repeater 505 may extract a transport block (or blocks) based at least in part on the set of stabilized REs. In some aspects, the digital repeater 505 may perform a de-scrambling operation (e.g., using scrambling identifiers associated with the incoming signal) to generate a set of descrambled REs. The digital repeater 505 may decode the set of descrambled REs in accordance with a network coding scheme associated with the incoming signal to determine one or more transport block. The digital repeater 505 may extract the transport blocks and may store the transport blocks in a buffer of the digital repeater 505.

The digital repeater 505 may use the transport blocks to re-generate the incoming signal in the Tx chain of the digital repeater 505 (e.g., immediately after extracting the transport block or at a later time). For example, the digital repeater 505 may encode the transport blocks (e.g., in accordance with the network coding scheme) to generate a set of recoded REs. The digital repeater 505 may scramble the recoded REs to create a re-generated version of the first signal. The digital repeater 505 may perform a modulation operation, a layer mapping operation, a pre-coding operation, an RE-mapping operation, and/or a digital beamforming procedure associated with the scrambled transport block.

In some aspects, to facilitate performance of the sixth processing option 550 by the digital repeater 505, the configuration may indicate further IEs associated with the reception configuration and/or the transmission configuration. These further IEs may be in addition to IEs described above in connection with the fifth processing option 545, the fourth processing option 540, the third processing option 535, the second processing option 530, the first processing option 525, and/or the like.

In some aspects, for example, the reception configuration may indicate a scrambling identifier associated with the first signal, a coding configuration associated with the first signal, and/or the like. In some aspects, the scrambling identifier may include a front haul radio network temporary identifier (FH-RNTI). The FH-RNTI may correspond to the digital repeater 505. In some aspects, the coding configuration may indicate a modulation and coding scheme (MCS), a coding technique, and/or the like. In some aspects, the forwarding configuration may indicate a scrambling identifier (e.g., an RNTI) associated with transmitting the second signal, a coding configuration associated with transmitting the second signal, and/or the like.

As described above, the digital repeater 505 may generate a second signal based at least in part on a digital processing operation. As shown by reference number 565, the digital repeater 505 may transmit, and the wireless node 515 may receive, the second signal. In some aspects, the digital repeater 505 may transmit the second signal to the control node 510, another wireless node (not shown in FIG. 5), and/or the like.

As indicated above, FIG. 5 is provided as an example. Other examples may differ from what is described with respect to FIG. 5.

Figure 6:
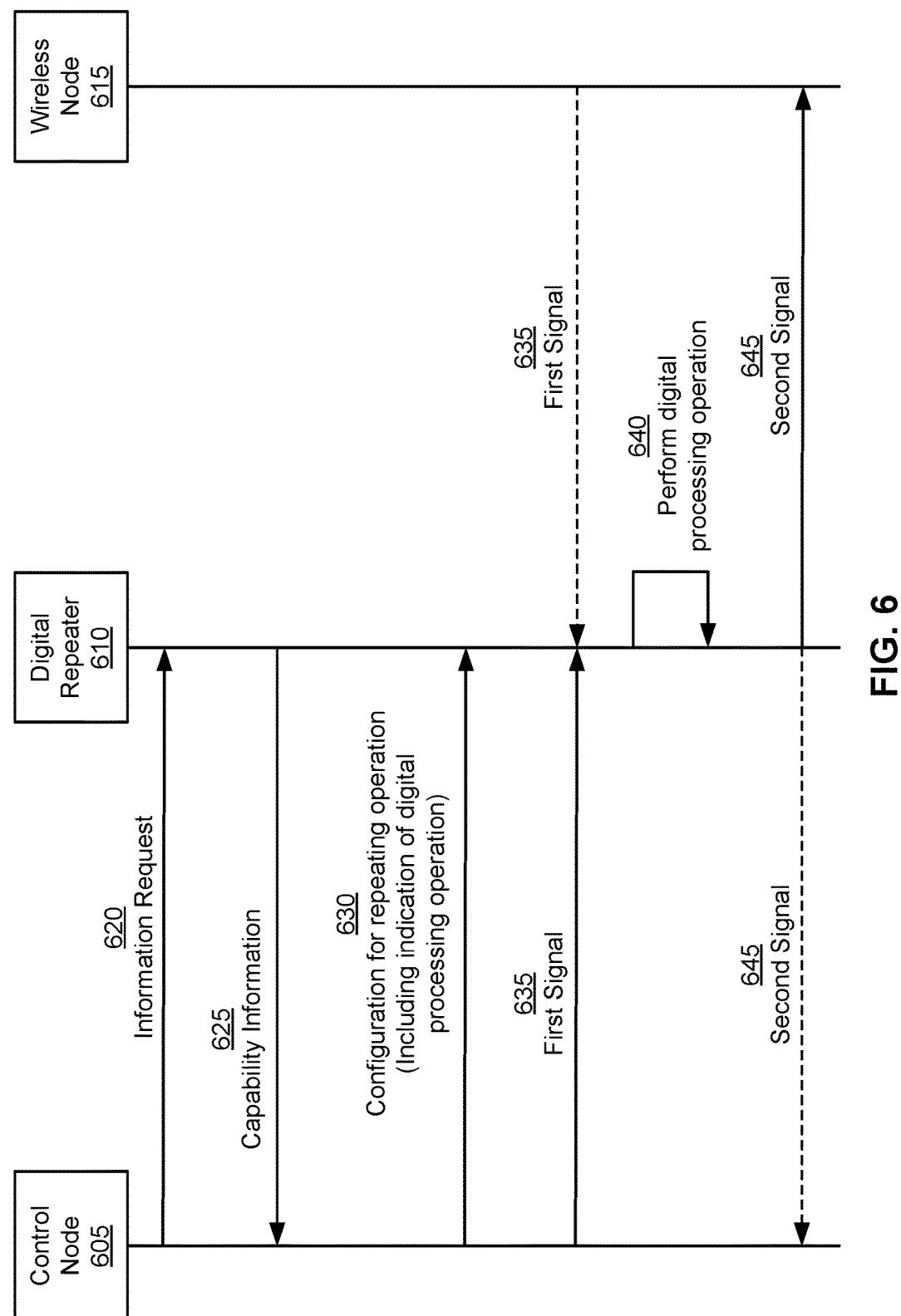

FIG. 6 is a diagram illustrating an example 600 associated with forwarding a wireless signal using a digital repeater, in accordance with the present disclosure. As shown in FIG. 6, a control node 605, a digital repeater 610, and a wireless node 615 may communicate with one another in a wireless network (e.g., wireless network 100).

In some aspects, the control node 605 may be, be similar to, include, or be included in the control node 510 shown in FIG. 5, the control node 410 shown in FIG. 4, and/or the like. In some aspects, the digital repeater 610 may be, be similar to, include, or be included in the digital repeater 505 shown in FIG. 5, the digital repeater 405 shown in FIG. 4, and/or the like. In some aspects, the wireless node 615 may be, be similar to, include, or be included in the wireless node 515 shown in FIG. 5, the wireless node 415 shown in FIG. 4, the wireless node 420 shown in FIG. 4, and/or the like.

As shown by reference number 620, the control node may transmit, and the digital repeater 610 may receive, an information request. As described above in connection with FIG. 5, the information request may include a request for a buffer status, a power status, a measurement report, a capability of the digital repeater, a configuration of the digital repeater, and/or the like. As shown by reference number 625, the digital repeater 610 may transmit, and the control node 605 may receive, capability information that may be used by the control node 605 to determine a configuration for a repeating operation. In some aspects, the digital repeater 610 may provide any number of additional types of information to the control node 605 such as, for example, a buffer status, a power status, a measurement report, a configuration of the digital repeater, and/or the like.

As shown by reference number 630, the control node 605 may transmit, and the digital repeater 610 may receive, a configuration for a repeating operation. As described above, the configuration may indicate a digital processing operation. The digital processing operation may include a digital processing option selected from a plurality of digital processing options, as explained above in connection with FIG. 5.

As shown by reference number 635, the control node 605 may transmit, and the digital repeater 610 may receive, a first signal 635. In some aspects, the wireless node 615 may transmit the first signal 635 to the digital repeater 610. In some aspects, another wireless node (not shown in FIG. 6) may transmit the first signal 635 to the digital repeater 610. The digital repeater 610 may perform a digital processing operation 640 to generate a second signal 645. The digital repeater 610 may transmit, and the wireless node 615 may receive, the second signal 645. Alternatively, or additionally, the digital repeater 610 may transmit the second signal 645 to the control node 605. In some aspects, the digital repeater 610 may transmit the second signal 645 to another wireless node (not shown in FIG. 6).

As indicated above, FIG. 6 is provided as an example. Other examples may differ from what is described with respect to FIG. 6.

Figure 7:
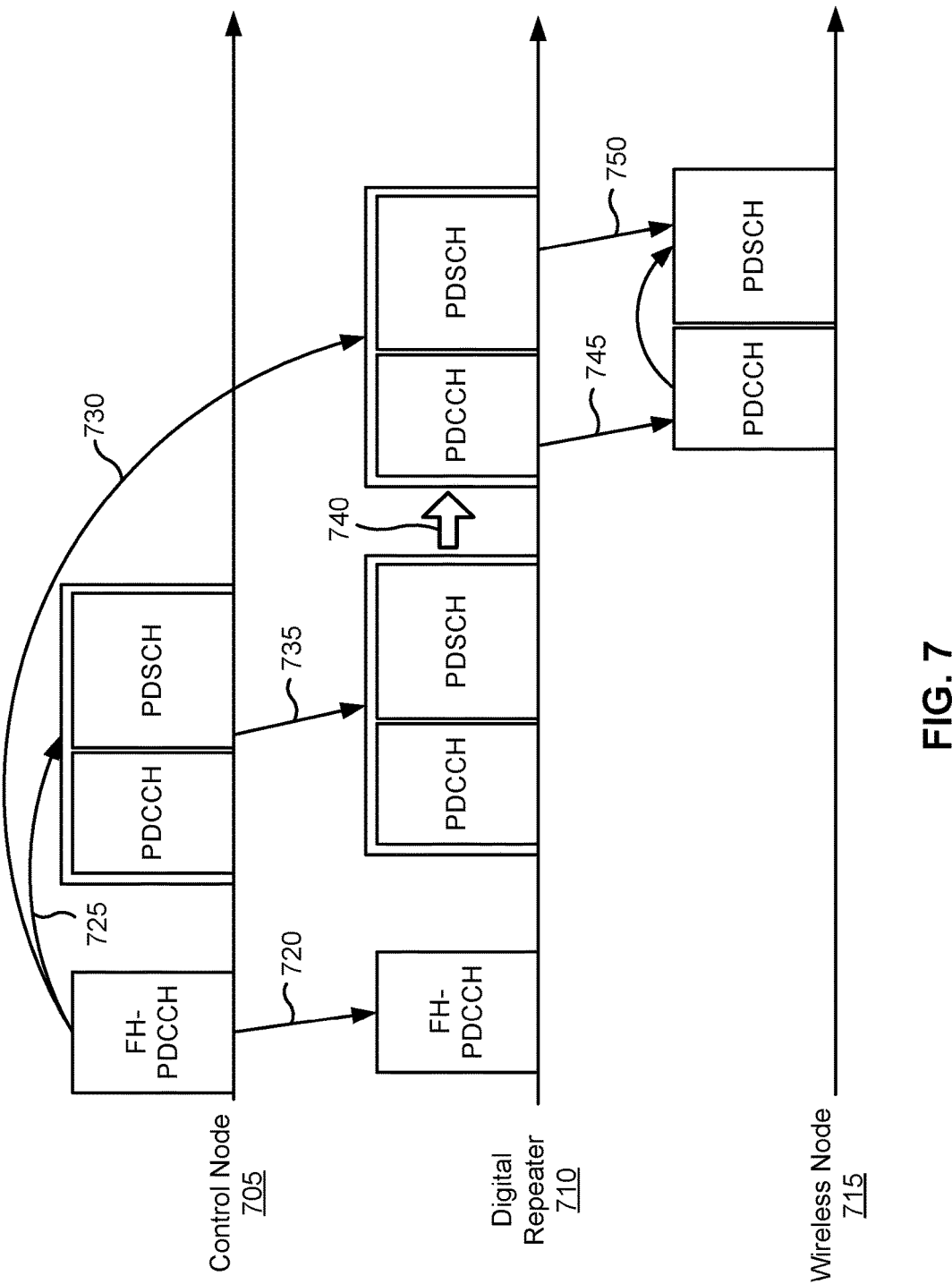

FIG. 7 is a diagram illustrating an example 700 associated with forwarding a wireless signal using a digital repeater, in accordance with the present disclosure. As shown in FIG. 7, a control node 705, a digital repeater 710, and a wireless node 715 may communicate with one another in a wireless network (e.g., wireless network 100).

In some aspects, the control node 705 may be, be similar to, include, or be included in the control node 605 shown in FIG. 6, the control node 510 shown in FIG. 5, the control node 410 shown in FIG. 4, and/or the like. In some aspects, the digital repeater 710 may be, be similar to, include, or be included in the digital repeater 610 shown in FIG. 6, the digital repeater 505 shown in FIG. 5, the digital repeater 405 shown in FIG. 4, and/or the like. In some aspects, the wireless node 715 may be, be similar to, include, or be included in the wireless node 615 shown in FIG. 6, the wireless node 515 shown in FIG. 5, the wireless node 415 shown in FIG. 4, the wireless node 420 shown in FIG. 4, and/or the like.

Example 700 is an example of a repeating operation involving a downlink communication. For example, the control node 705 may determine that it is to send a PDSCH communication to the wireless node 715. However, the control node 705 may determine that the wireless node 715 is outside of a communication range of the control node 705. Therefore, the control node 705 may utilize the digital repeater 710 to transmit the PDSCH communication to the wireless node 715.

As shown by reference number 720, the control node 705 may transmit a PDCCH communication to the digital repeater 710. The PDCCH communication may be an FH-PDCCH communication such as a control message (e.g., the control message 455 shown in FIG. 4). As shown by reference number 725, the FH-PDCCH communication may schedule a PDSCH communication (e.g., an access link PDSCH communication) and/or a PDCCH communication (e.g., an FH-PDCCH, an access link PDCCH, and/or the like) that is to be transmitted to the digital repeater 710. As shown by reference number 730, the FH-PDCCH communication may include a configuration (e.g., the configuration 450 shown in FIG. 4) that configures the digital repeater 710 to forward the PDSCH communication and/or the PDCCH communication that is to be transmitted to wireless node 715. In some aspects, more than one FH-PDCCH communication may be used to configure the digital repeater 710.

As shown by reference number 735, the control node 705 may transmit, to the digital repeater 710, the PDSCH communication and/or the PDCCH communication scheduled by the PDCCH communication shown by reference number 720. As shown by reference number 740, the digital repeater 710 may generate a PDCCH communication and/or a PDSCH communication based at least in part on receiving the PDSCH communication from the control node. In some aspects, the digital repeater 710 may generate the PDCCH communication and/or the PDSCH communication based at least in part on a digital processing operation that was configured by the configuration shown by reference number 730. In some aspects, the generated PDCCH communication may schedule the generated PDSCH communication to be transmitted by the digital repeater 710.

As shown by reference number 745, the digital repeater 710 may transmit the generated PDCCH communication to the wireless node 715 that schedules the generated PDSCH communication. As shown by reference number 750, the digital repeater 710 may transmit the generated PDSCH communication to the wireless node 715. The digital repeater 710 may transmit the generated PDCCH communication and the generated PDSCH communication to the wireless node 715 using an access link.

In some aspects, the configuration also may configure, using the FH-PDCCH communication and/or one or more other FH-PDCCH communications, a repeating operation (e.g., a digital processing operation, time domain resources, frequency domain resources, and/or the like) for an ACK/NACK feedback message that may be transmitted by the wireless node 715 and addressed to the control node 705. In some aspects, the configuration may configure one or more repeating operations (e.g., a digital processing operation, time domain resources, frequency domain resources, and/or the like) associated with future uplink transmissions that may be transmitted from the wireless node 715 and addressed to the control node 705. In some aspects, the one or more repeating operation configurations may include configuring semi-static uplink control resources that may be used by the wireless node 715 to transmit control messages such as, for example, scheduling requests.

As indicated above, FIG. 7 is provided as an example. Other examples may differ from what is described with respect to FIG. 7.

Figure 8:
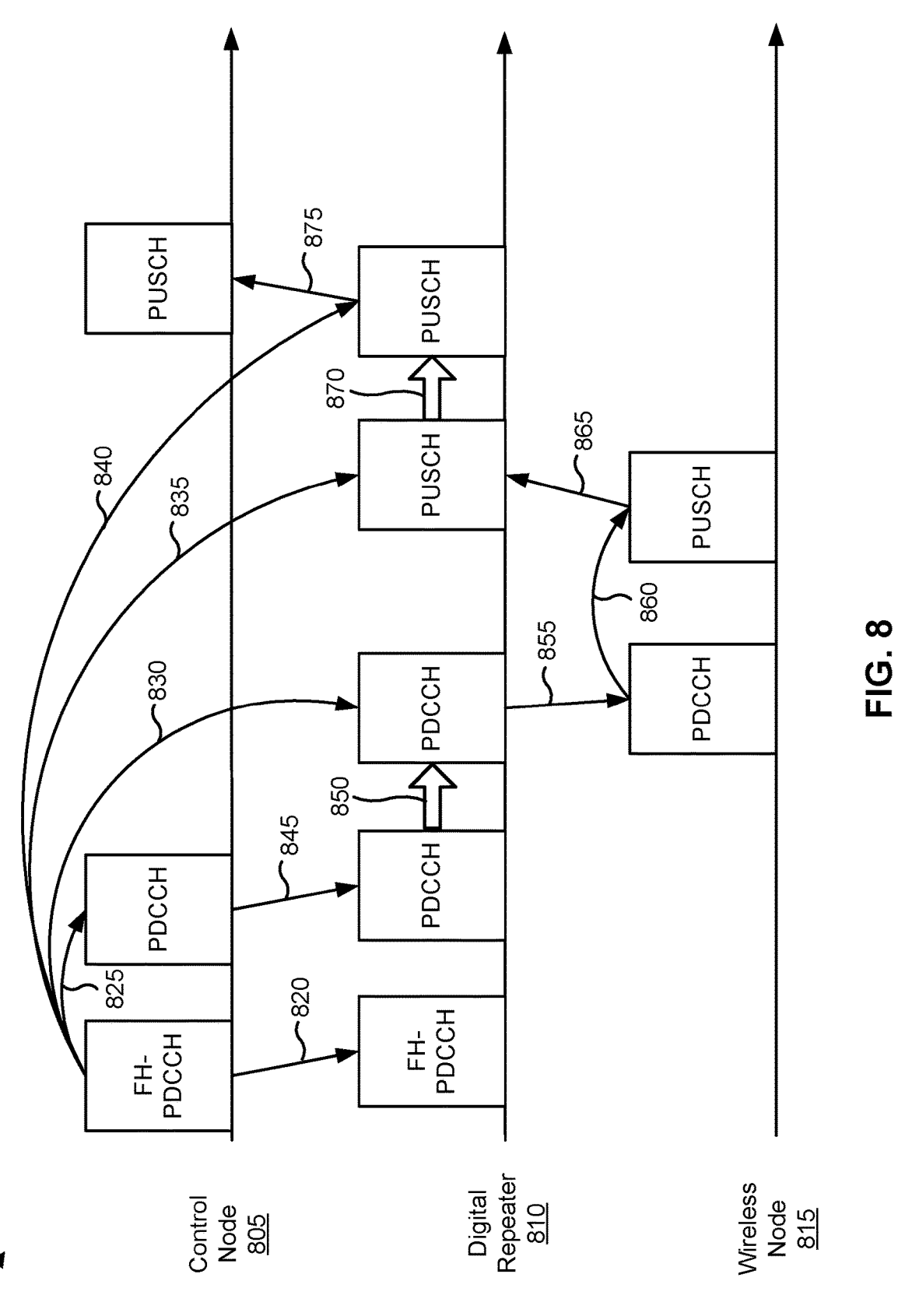

FIG. 8 is a diagram illustrating an example 800 associated with forwarding a wireless signal using a digital repeater, in accordance with the present disclosure. As shown in FIG. 8, a control node 805, a digital repeater 810, and a wireless node 815 may communicate with one another in a wireless network (e.g., wireless network 100).

In some aspects, the control node 805 may be, be similar to, include, or be included in the control node 705 shown in FIG. 7, the control node 605 shown in FIG. 6, the control node 510 shown in FIG. 5, the control node 410 shown in FIG. 4, and/or the like. In some aspects, the digital repeater 810 may be, be similar to, include, or be included in the digital repeater 710 shown in FIG. 7, the digital repeater 610 shown in FIG. 6, the digital repeater 505 shown in FIG. 5, the digital repeater 405 shown in FIG. 4, and/or the like. In some aspects, the wireless node 815 may be, be similar to, include, or be included in the wireless node 715 shown in FIG. 7, the wireless node 615 shown in FIG. 6, the wireless node 515 shown in FIG. 5, the wireless node 415 shown in FIG. 4, the wireless node 420 shown in FIG. 4, and/or the like.

Example 800 may be an example of a repeating operation involving an uplink communication. For example, the wireless node 815 may have an uplink communication to transmit to the control node 805. However, the control node 805 may be outside of a communication range of the wireless node 815. As a result, the control node 805 may configure the digital repeater 810 to forward the uplink communication from the wireless node 815 to the control node 805.

As shown by reference number 820, the control node 805 may transmit an FH-PDCCH communication to the digital repeater 810. In some aspects, the FH-PDCCH communication may include a content of a PDCCH communication to be transmitted to the wireless node 815 (e.g., a scheduling grant, a resource allocation for an uplink transmission, and/or the like). As shown by reference number 825, the FH-PDCCH communication may schedule a PDCCH communication to be transmitted to the digital repeater 810. As shown by reference number 830, the FH-PDCCH communication may include a configuration indicating how the digital repeater 810 is to transmit a re-generated version of the PDCCH communication to the wireless node 815 (e.g., a resource allocation, a beamforming configuration, and/or the like). In some aspects, as shown by reference number 835, the FH-PDCCH communication may include a configuration indicating how the digital repeater 810 is to receive the uplink communication from the wireless node 815 (e.g., a resource allocation, a beamforming configuration, and/or the like). In some aspects, as shown by reference number 840, the FH-PDCCH communication may include a configuration indicating how the digital repeater 810 is to transmit a re-generated version of the uplink communication to the control node 805. In some aspects, one or more additional FH-PDCCH communications may be used to transmit one or more aspects of the configurations described above.

As shown by reference number 845, the control node 805 may transmit a PDCCH communication to the digital repeater 810. As shown by reference number 850, the digital repeater 810 may generate, based at least in part on a configured digital processing operation, a re-generated version of the PDCCH communication to transmit to the wireless node 815 to schedule an uplink communication. In some aspects, the digital repeater 810 may not generate a PDCCH communication (e.g., if the uplink communication is semi-static, periodic, or pre-configured uplink transmission that is not scheduled by a PDCCH communication). In that case, the downlink configuration may only indicate how the digital repeater 810 is to receive the uplink communication from the wireless node 815, how the digital repeater 810 is to generate another uplink communication based at least in part on the uplink communication from the wireless node 815, and/or how the digital repeater 810 is to transmit the generated uplink communication to the control node 805.

As shown by reference number 855, the digital repeater 810 may transmit the generated PDCCH communication to the wireless node 815. The digital repeater 810 may transmit the generated PDCCH communication using an access link. As shown by reference number 860, the generated PDCCH communication may schedule an uplink communication (e.g., a PUSCH communication and/or the like) to be transmitted by the wireless node 815.

As shown by reference number 865, the wireless node 815 may transmit the PUSCH communication. In some aspects, the wireless node 815 may not address the PUSCH communication to the digital repeater 810 (e.g., the wireless node 815 may be unaware of the digital repeater 810 and may simply be attempting to transmit the PUSCH communication to the control node 805). The digital repeater 810 may receive the PUSCH communication based at least in part on the configuration indicated by the control node 805. In some aspects, the wireless node 815 may transmit uplink control information (e.g., a PUCCH communication).

As shown by reference number 870, the digital repeater 810 may generate a re-generated version of the PUSCH communication based at least in part on the uplink communication (e.g., PUSCH communication or PUCCH communication) received from the wireless node 815. In some aspects, the digital repeater 810 may generate the re-generated version of the PUSCH communication based at least in part on a configuration provided by the control node 805. As shown by reference number 875, the digital repeater 810 may transmit the generated PUSCH communication to the control node 805. In some aspects, the digital repeater 810 may transmit the generated PUSCH communication to the control node 805 using a fronthaul link.

As indicated above, FIG. 8 is provided as an example. Other examples may differ from what is described with respect to FIG. 8.

FIG. 9 is a diagram illustrating an example process 900 performed, for example, by a digital repeater, in accordance with the present disclosure. Example process 900 is an example where the digital repeater (e.g., digital repeater 405 shown in FIG. 4, digital repeater 505 shown in FIG. 5, digital repeater 610 shown in FIG. 6, apparatus 1100 shown in FIG. 11, and/or the like) performs operations associated with techniques for forwarding a wireless signal using a digital repeater.

As shown in FIG. 9, in some aspects, process 900 may include receiving, using a control component of the digital repeater, a configuration that indicates a digital processing operation, wherein the control component receives the configuration from a control node via a wireless control interface (block 910). For example, the digital repeater (e.g., using reception component 1102 of FIG. 11) may receive, using a control component of the digital repeater, a configuration that indicates a digital processing operation, wherein the control component receives the configuration from a control node via a wireless control interface, as described above.

As further shown in FIG. 9, in some aspects, process 900 may include receiving a first signal (block 920). For example, the digital repeater (e.g., using reception component 1102 of FIG. 11) may receive a first signal, as described above.

As further shown in FIG. 9, in some aspects, process 900 may include performing, using a repeating component of the digital repeater, the digital processing operation on the first signal to generate a second signal, wherein the second signal comprises a re-generated version of the first signal (block 930). For example, the digital repeater (e.g., using processing component 1108 of FIG. 11) may perform, using a repeating component of the digital repeater, the digital processing operation on the first signal to generate a second signal, wherein the second signal comprises a re-generated version of the first signal, as described above.

As further shown in FIG. 9, in some aspects, process 900 may include transmitting the second signal (block 940). For example, the digital repeater (e.g., using transmission component 1104 of FIG. 11) may transmit the second signal, as described above.

Process 900 may include additional aspects, such as any single aspect or any combination of aspects described below and/or in connection with one or more other processes described elsewhere herein.

In a first aspect, receiving the first signal comprises receiving a millimeter wave wireless signal.

In a second aspect, alone or in combination with the first aspect, the configuration indicates a beamforming configuration for at least one of receiving the first signal or transmitting the second signal.

In a third aspect, alone or in combination with one or more of the first and second aspects, performing the digital processing operation comprises obtaining a plurality of digital samples from the first signal, storing the plurality of digital samples, and extracting a plurality of tones from the plurality of digital samples.

In a fourth aspect, alone or in combination with one or more of the first through third aspects, the wireless control interface comprises an in-band control interface.

In a fifth aspect, alone or in combination with one or more of the first through fourth aspects, the first signal is received using a frequency, and control messages are received via the in-band control interface using the frequency.

In a sixth aspect, alone or in combination with one or more of the first through fifth aspects, process 900 includes transmitting at least one control message to the control node, wherein the at least one control message indicates at least one of a configuration of the digital repeater, a capability of the digital repeater, or a status of the digital repeater.

In a seventh aspect, alone or in combination with one or more of the first through sixth aspects, process 900 includes establishing, using the control component and a frequency, an access link to the control node.

In an eighth aspect, alone or in combination with one or more of the first through seventh aspects, process 900 includes receiving a BWP configuration that indicates a BWP corresponding to the wireless control interface.

In a ninth aspect, alone or in combination with one or more of the first through eighth aspects, the configuration is carried by a control message comprising at least one of DCI, an RRC message, or a MAC-CE.

In a tenth aspect, alone or in combination with one or more of the first through ninth aspects, the configuration is carried in an FH-PDCCH control message.

In an eleventh aspect, alone or in combination with one or more of the first through tenth aspects, the FH-PDCCH control message comprises DCI scrambled by an FH-RNTI, wherein the FH-RNTI is associated with the control component.

In a twelfth aspect, alone or in combination with one or more of the first through eleventh aspects, the wireless control interface comprises an out-of-band control interface.

In a thirteenth aspect, alone or in combination with one or more of the first through twelfth aspects, the first signal is received using a first frequency and control messages are received via the control interface using a second frequency that is different than the first frequency.

In a fourteenth aspect, alone or in combination with one or more of the first through thirteenth aspects, the second frequency is lower than the first frequency.

In a fifteenth aspect, alone or in combination with one or more of the first through fourteenth aspects, the control component is based at least in part on an LTE narrow band IoT UE.

In a sixteenth aspect, alone or in combination with one or more of the first through fifteenth aspects, the control component is based at least in part on an NR sub-6 reduced capability UE.

In a seventeenth aspect, alone or in combination with one or more of the first through sixteenth aspects, the control component is based on a UE specification that specifies a plurality of functions supported by the UE, and the control component does not support all of the plurality of functions.

In an eighteenth aspect, alone or in combination with one or more of the first through seventeenth aspects, the first signal is received using a first RAT, and control messages are received via the control interface using a second RAT that is different than the first RAT.

In a nineteenth aspect, alone or in combination with one or more of the first through eighteenth aspects, the configuration is carried in a control message comprising at least one of a lower-layer control message, an upper-layer control message, or an application-layer control message.

In a twentieth aspect, alone or in combination with one or more of the first through nineteenth aspects, process 900 includes receiving, from the control node, a control message that indicates at least one of a reception beamforming configuration associated with the first signal, a reception time domain resource associated with the first signal, a transmission beamforming configuration associated with transmitting the second signal, or a transmission time domain resource associated with transmitting the second signal.

In a twenty-first aspect, alone or in combination with one or more of the first through twentieth aspects, the reception beamforming configuration indicates an index associated with a beamforming codebook.

In a twenty-second aspect, alone or in combination with one or more of the first through twenty-first aspects, the reception beamforming configuration indicates at least one of a phase setting of an antenna element of the digital repeater or an amplitude setting of the antenna element of the digital repeater.

In a twenty-third aspect, alone or in combination with one or more of the first through twenty-second aspects, process 900 includes transmitting a control message to the control node, wherein the control message indicates a beamforming capability of the digital repeater, and wherein the reception beamforming configuration is based at least in part on the beamforming capability.

In a twenty-fourth aspect, alone or in combination with one or more of the first through twenty-third aspects, the transmission time domain resource is indicated relative to the reception time domain resource.

In a twenty-fifth aspect, alone or in combination with one or more of the first through twenty-fourth aspects, the transmission time domain resource is based at least in part on a synchronization characteristic corresponding to a synchronization mode between the digital repeater and the control node.

In a twenty-sixth aspect, alone or in combination with one or more of the first through twenty-fifth aspects, the synchronization characteristic indicates a synchronous mode between the digital repeater and the control node, the transmission time domain resource is based at least in part on an indication of the reception time domain resource, and the indication of the reception time domain resource indicates at least one of a symbol identifier, a slot identifier, or a frame identifier.

In a twenty-seventh aspect, alone or in combination with one or more of the first through twenty-sixth aspects, the synchronization characteristic indicates an asynchronous mode between the digital repeater and the control node, the transmission time domain resource is based at least in part on an indication of a reference time domain resource, and the indication of the reference time domain resource indicates at least one of a symbol identifier, a slot identifier, or a frame identifier.

In a twenty-eighth aspect, alone or in combination with one or more of the first through twenty-seventh aspects, process 900 includes transmitting, using the control component, an additional control message to the control node, where the reference time domain resource corresponds to the additional control message.

In a twenty-ninth aspect, alone or in combination with one or more of the first through twenty-eighth aspects, the synchronization characteristic indicates an out-of-sync synchronization mode between the digital repeater and the control node, the transmission time domain resource is based at least in part on a reference time domain resource, and the reference time domain resource corresponds to the configuration.

In a thirtieth aspect, alone or in combination with one or more of the first through twenty-ninth aspects, process 900 includes transmitting a control message to the control node, wherein the control message includes one or more IEs, the one or more IEs indicating at least one of an operation supported by the digital repeater, a beamforming codebook characteristic, a beamforming capability, a transmitter power configuration, a timing configuration, a buffer status, an ADC configuration, an ADC setting, a DAC configuration, a DAC setting, an IQ sample compression capability, an IQ sample decompression capability, an IQ sample compression setting, or an IQ sample decompression setting.

In a thirty-first aspect, alone or in combination with one or more of the first through thirtieth aspects, the beamforming codebook characteristic indicates at least one of a number of transmitter beams available, a number of receiver beams available, a spatial quasi co-location characteristic associated with a beam, a number of antenna arrays, a number of antenna panels, an association between a beam and an antenna array, or an association between a beam and an antenna panel.

In a thirty-second aspect, alone or in combination with one or more of the first through thirty-first aspects, the transmitter power configuration indicates at least one of a power headroom, a maximum transmitter power, a maximum gain level, a current gain setting, or a current transmitter power.

In a thirty-third aspect, alone or in combination with one or more of the first through thirty-second aspects, the timing configuration indicates at least one of a level of synchronization between the digital repeater and the control node, a synchronous operation supported by the digital repeater, or an asynchronous operation supported by the digital repeater.

In a thirty-fourth aspect, alone or in combination with one or more of the first through thirty-third aspects, the buffer status indicates at least one of an available memory, a maximum buffer size, or a buffer overflow.

In a thirty-fifth aspect, alone or in combination with one or more of the first through thirty-fourth aspects, the first signal comprises at least one of a PDCCH transmission, a PDSCH transmission, a PUCCH transmission, a PUSCH transmission, or an ACK/NACK feedback message.

In a thirty-sixth aspect, alone or in combination with one or more of the first through thirty-fifth aspects, the digital processing operation comprises a digital processing option selected from a plurality of digital processing options.

In a thirty-seventh aspect, alone or in combination with one or more of the first through thirty-sixth aspects, the digital processing option is based at least in part on at least one of time domain IQ sample buffering, tone extraction, element extraction, channeling estimation and equalization, or decoding the first signal.

In a thirty-eighth aspect, alone or in combination with one or more of the first through thirty-seventh aspects, the configuration comprises at least one control IE, the at least one control IE indicating a reception configuration, a buffering configuration, a forwarding configuration, or an information request.

In a thirty-ninth aspect, alone or in combination with one or more of the first through thirty-eighth aspects, the reception configuration indicates at least one of a reception analog beamforming configuration, a time domain resource associated with the first signal, a frequency domain resource associated with the first signal, a numerology associated with the first signal, a digital receiver beamforming configuration, RE mapping information associated with the first signal, a channel estimation configuration, a scrambling identifier associated with the first signal, or a coding configuration associated with the first signal.

In a fortieth aspect, alone or in combination with one or more of the first through thirty-ninth aspects, the frequency domain resource associated with the first signal comprises at least one of a center frequency, a bandwidth, or a bandwidth part.

In a forty-first aspect, alone or in combination with one or more of the first through fortieth aspects, the numerology associated with the first signal comprises at least one of a CP size, an SCS, or an FFT size.

In a forty-second aspect, alone or in combination with one or more of the first through forty-first aspects, the RE mapping information associated with the first signal comprises a plurality of indices corresponding to a plurality of occupied tones associated with the first signal.

In a forty-third aspect, alone or in combination with one or more of the first through forty-second aspects, the channel estimation configuration indicates at least one of a resource associated with a reference signal, or a configuration associated with the reference signal.

In a forty-fourth aspect, alone or in combination with one or more of the first through forty-third aspects, the coding configuration indicates at least one of an MCS or a coding technique.

In a forty-fifth aspect, alone or in combination with one or more of the first through forty-fourth aspects, the buffering configuration indicates at least one of an ADC setting, a DAC setting, an IQ sample compression setting, or an IQ sample decompression setting.

In a forty-sixth aspect, alone or in combination with one or more of the first through forty-fifth aspects, the ADC setting comprises at least one of an ADC resolution, or a sample rate.

In a forty-seventh aspect, alone or in combination with one or more of the first through forty-sixth aspects, the forwarding configuration comprises at least one of a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, or a coding configuration associated with transmitting the second signal.

In a forty-eighth aspect, alone or in combination with one or more of the first through forty-seventh aspects, the numerology associated with forwarding the first signal comprises at least one of a CP size, an SCS, or an FFT size.

In a forty-ninth aspect, alone or in combination with one or more of the first through forty-eighth aspects, the RE mapping information associated with forwarding the first signal comprises a plurality of indices corresponding to a plurality of occupied tones associated with transmitting the second signal.

In a fiftieth aspect, alone or in combination with one or more of the first through forty-ninth aspects, the information request comprises a request for at least one of a buffer status, a power status, a measurement report, a capability of the digital repeater, or a configuration of the digital repeater.

In a fifty-first aspect, alone or in combination with one or more of the first through fiftieth aspects, the request for the power status comprises a request for a power headroom of the digital repeater.

In a fifty-second aspect, alone or in combination with one or more of the first through fifty-first aspects, the request for the measurement report comprises a request for a signal quality measurement.

In a fifty-third aspect, alone or in combination with one or more of the first through fifty-second aspects, process 900 includes transmitting a periodic report to the control node, wherein the periodic report indicates at least one of a capability of the digital repeater, or a configuration of the digital repeater.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a control node, in accordance with the present disclosure. Example process 1000 is an example where the control node (e.g., control node 410 shown in FIG. 4, control node 510 shown in FIG. 5, control node 605 shown in FIG. 6, apparatus 1200 shown in FIG. 12, and/or the like) performs operations associated with techniques for forwarding a wireless signal using a digital repeater.

As shown in FIG. 10, in some aspects, process 1000 may include determining a configuration for a repeating operation that facilitates forwarding a first signal from a first wireless node to a second wireless node, wherein the configuration indicates a digital processing operation for regenerating the first signal to create a second signal, and wherein the digital processing operation comprises a digital processing option selected from a plurality of digital processing options (block 1010). For example, the control node (e.g., using determining component 1208) may determine a configuration for a repeating operation that facilitates forwarding a first signal from a first wireless node to a second wireless node, wherein the configuration indicates a digital processing operation for regenerating the first signal to create a second signal, and wherein the digital processing operation comprises a digital processing option selected from a plurality of digital processing options, as described above.

As further shown in FIG. 10, in some aspects, process 1000 may include transmitting the configuration to a control component of a digital repeater via a wireless control interface (block 1020). For example, the digital repeater (e.g., using transmission component 1204) may transmit the configuration to a control component of a digital repeater via a wireless control interface, as described above.

Process 1000 may include additional aspects, such as any single aspect or any combination of aspects described below and/or in connection with one or more other processes described elsewhere herein.

In a first aspect, the first signal comprises a millimeter wave wireless signal.

In a second aspect, alone or in combination with the first aspect, the configuration indicates a beamforming configuration for at least one of receiving the first signal or transmitting the second signal.

In a third aspect, alone or in combination with one or more of the first and second aspects, the digital processing operation is configured to facilitate extraction of a plurality of tones from the first signal.

In a fourth aspect, alone or in combination with one or more of the first through third aspects, the wireless control interface comprises an in-band control interface.

In a fifth aspect, alone or in combination with one or more of the first through fourth aspects, process 1000 includes receiving at least one control message from the digital repeater, where the at least one control message indicates at least one of a configuration of the digital repeater, a capability of the digital repeater, or a status of the digital repeater.

In a sixth aspect, alone or in combination with one or more of the first through fifth aspects, process 1000 includes establishing an access link with the control component of the control node.

In a seventh aspect, alone or in combination with one or more of the first through sixth aspects, process 1000 includes transmitting, to the digital repeater, a BWP configuration that indicates a BWP corresponding to the wireless control interface.

In an eighth aspect, alone or in combination with one or more of the first through seventh aspects, the configuration is carried by a control message comprising at least one of DCI, an RRC message, or a MAC-CE.

In a ninth aspect, alone or in combination with one or more of the first through eighth aspects, the configuration is carried in an FH-PDCCH control message.

In a tenth aspect, alone or in combination with one or more of the first through ninth aspects, the FH-PDCCH control message comprises downlink control information scrambled by an FH-RNTI, wherein the FH-RNTI is associated with the control component.

In an eleventh aspect, alone or in combination with one or more of the first through tenth aspects, the wireless control interface comprises an out-of-band control interface.

In a twelfth aspect, alone or in combination with one or more of the first through eleventh aspects, the control component is based at least in part on an LTE narrow band IoT UE.

In a thirteenth aspect, alone or in combination with one or more of the first through twelfth aspects, the control component is based at least in part on an NR sub-6 reduced capability UE.

In a fourteenth aspect, alone or in combination with one or more of the first through thirteenth aspects, the control component is based on a UE specification that specifies a plurality of functions supported by the UE, and the control component does not support all of the plurality of functions.

In a fifteenth aspect, alone or in combination with one or more of the first through fourteenth aspects, the configuration is carried in a control message comprising at least one of a lower-layer control message, an upper-layer control message, or an application-layer control message.

In a sixteenth aspect, alone or in combination with one or more of the first through fifteenth aspects, process 1000 includes transmitting, to the digital repeater, a control message that indicates at least one of a reception beamforming configuration associated with the first signal, a reception time domain resource associated with the first signal, a transmission beamforming configuration associated with transmitting the second signal, or a transmission time domain resource associated with transmitting the second signal.

In a seventeenth aspect, alone or in combination with one or more of the first through sixteenth aspects, the reception beamforming configuration indicates an index associated with a beamforming codebook.

In an eighteenth aspect, alone or in combination with one or more of the first through seventeenth aspects, the reception beamforming configuration indicates at least one of a phase setting of an antenna element of the digital repeater, or an amplitude setting of the antenna element of the digital repeater.

In a nineteenth aspect, alone or in combination with one or more of the first through eighteenth aspects, process 1000 includes receiving a control message from the digital repeater, the control message indicates a beamforming capability of the digital repeater, and the reception beamforming configuration is based at least in part on the beamforming capability.

In a twentieth aspect, alone or in combination with one or more of the first through nineteenth aspects, the transmission time domain resource is indicated relative to the reception time domain resource.

In a twenty-first aspect, alone or in combination with one or more of the first through twentieth aspects, the transmission time domain resource is based at least in part on a synchronization characteristic corresponding to a synchronization mode between the digital repeater and the control node.

In a twenty-second aspect, alone or in combination with one or more of the first through twenty-first aspects, the synchronization characteristic indicates a synchronous mode between the digital repeater and the control node, and the transmission time domain resource is based at least in part on an indication of the reception time domain resource, wherein the indication of the reception time domain resource indicates at least one of a symbol identifier, a slot identifier, or a frame identifier.

In a twenty-third aspect, alone or in combination with one or more of the first through twenty-second aspects, the synchronization characteristic indicates an asynchronous mode between the digital repeater and the control node, and the transmission time domain resource is based at least in part on an indication of a reference time domain resource, wherein the indication of the reference time domain resource indicates at least one of a symbol identifier, a slot identifier, or a frame identifier.

In a twenty-fourth aspect, alone or in combination with one or more of the first through twenty-third aspects, process 1000 includes receiving, from the control component, an additional control message, where the reference time domain resource corresponds to the additional control message.

In a twenty-fifth aspect, alone or in combination with one or more of the first through twenty-fourth aspects, the synchronization characteristic indicates an out-of-sync synchronization mode between the digital repeater and the control node, and the transmission time domain resource is based at least in part on a reference time domain resource, wherein the reference time domain resource corresponds to the configuration.

In a twenty-sixth aspect, alone or in combination with one or more of the first through twenty-fifth aspects, process 1000 includes receiving a control message from the digital repeater, wherein the control message includes one or more IEs, the one or more IEs indicating at least one of an operation supported by the digital repeater, a beamforming codebook characteristic, a beamforming capability, a transmitter power configuration, a timing configuration, a buffer status, an ADC configuration, an ADC setting, a DAC configuration, a DAC setting, an IQ sample compression capability, an IQ sample decompression capability, an IQ sample compression setting, or an IQ sample decompression setting.

In a twenty-seventh aspect, alone or in combination with one or more of the first through twenty-sixth aspects, the beamforming codebook characteristic indicates at least one of a number of transmitter beams available, a number of receiver beams available, a spatial quasi co-location characteristic associated with a beam, a number of antenna arrays, a number of antenna panels, an association between a beam and an antenna array, or an association between a beam and an antenna panel.

In a twenty-eighth aspect, alone or in combination with one or more of the first through twenty-seventh aspects, the transmitter power configuration indicates at least one of a power headroom, a maximum transmitter power, a maximum gain level, a current gain setting, or a current transmitter power.

In a twenty-ninth aspect, alone or in combination with one or more of the first through twenty-eighth aspects, the timing configuration indicates at least one of a level of synchronization between the digital repeater and the control node, a synchronous operation supported by the digital repeater, or an asynchronous operation supported by the digital repeater.

In a thirtieth aspect, alone or in combination with one or more of the first through twenty-ninth aspects, the buffer status indicates at least one of an available memory, a maximum buffer size, or a buffer overflow.

In a thirty-first aspect, alone or in combination with one or more of the first through thirtieth aspects, the first signal comprises at least one of a PDCCH transmission, a PDSCH transmission, a PUCCH transmission, a PUSCH transmission, or an ACK/NACK feedback message.

In a thirty-second aspect, alone or in combination with one or more of the first through thirty-first aspects, the digital processing operation comprises a digital processing option selected from a plurality of digital processing options.

In a thirty-third aspect, alone or in combination with one or more of the first through thirty-second aspects, the digital processing option is based at least in part on at least one of time IQ sample buffering, tone extraction, element extraction, channeling estimation and equalization, or decoding the first signal.

In a thirty-fourth aspect, alone or in combination with one or more of the first through thirty-third aspects, the configuration comprises at least one IE, the at least one control IE indicating a reception configuration, a buffering configuration, a forwarding configuration, or an information request.

In a thirty-fifth aspect, alone or in combination with one or more of the first through thirty-fourth aspects, the reception configuration indicates at least one of a reception analog beamforming configuration, a time domain resource associated with the first signal, a frequency domain resource associated with the first signal, a numerology associated with the first signal, a digital receiver beamforming configuration, RE mapping information associated with the first signal, a channel estimation configuration, a scrambling identifier associated with the first signal, or a coding configuration associated with the first signal.

In a thirty-sixth aspect, alone or in combination with one or more of the first through thirty-fifth aspects, the frequency domain resource associated with the first signal comprises at least one of a center frequency, a bandwidth, or a bandwidth part.

In a thirty-seventh aspect, alone or in combination with one or more of the first through thirty-sixth aspects, the numerology associated with the first signal comprises at least one of a CP size, an SCS, or an FFT size.

In a thirty-eighth aspect, alone or in combination with one or more of the first through thirty-seventh aspects, the RE mapping information associated with the first signal comprises a plurality of indices corresponding to a plurality of occupied tones associated with the first signal.

In a thirty-ninth aspect, alone or in combination with one or more of the first through thirty-eighth aspects, the channel estimation configuration indicates at least one of a resource associated with a reference signal, or a configuration associated with the reference signal.

In a fortieth aspect, alone or in combination with one or more of the first through thirty-ninth aspects, the coding configuration indicates at least one of an MCS or a coding technique.

In a forty-first aspect, alone or in combination with one or more of the first through fortieth aspects, the buffering configuration indicates at least one of an ADC setting, a DAC setting, an IQ sample compression setting, or an IQ sample decompression setting.

In a forty-second aspect, alone or in combination with one or more of the first through forty-first aspects, the ADC setting comprises at least one of an ADC resolution, or a sample rate.

In a forty-third aspect, alone or in combination with one or more of the first through forty-second aspects, the forwarding configuration comprises at least one of a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, or a coding configuration associated with transmitting the second signal.

In a forty-fourth aspect, alone or in combination with one or more of the first through forty-third aspects, the numerology associated with forwarding the first signal comprises at least one of a CP size, an SCS, or an FFT size.

In a forty-fifth aspect, alone or in combination with one or more of the first through forty-fourth aspects, the RE mapping information associated with forwarding the first signal comprises a plurality of indices corresponding to a plurality of occupied tones associated with transmitting the second signal.

In a forty-sixth aspect, alone or in combination with one or more of the first through forty-fifth aspects, the information request comprises a request for at least one of a buffer status, a power status, a measurement report, a capability of the digital repeater, or a configuration of the digital repeater.

In a forty-seventh aspect, alone or in combination with one or more of the first through forty-sixth aspects, the request for the power status comprises a request for a power headroom of the digital repeater.

In a forty-eighth aspect, alone or in combination with one or more of the first through forty-seventh aspects, the request for the measurement report comprises a request for a signal quality measurement.

In a forty-ninth aspect, alone or in combination with one or more of the first through forty-eighth aspects, process 1000 includes receiving a periodic report from the digital repeater, wherein the periodic report indicates at least one of a capability of the digital repeater, or a configuration of the digital repeater.

In a fiftieth aspect, alone or in combination with one or more of the first through forty-ninth aspects, process 1000 includes communicating with a wireless node, via the digital repeater, based at least in part on the configuration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
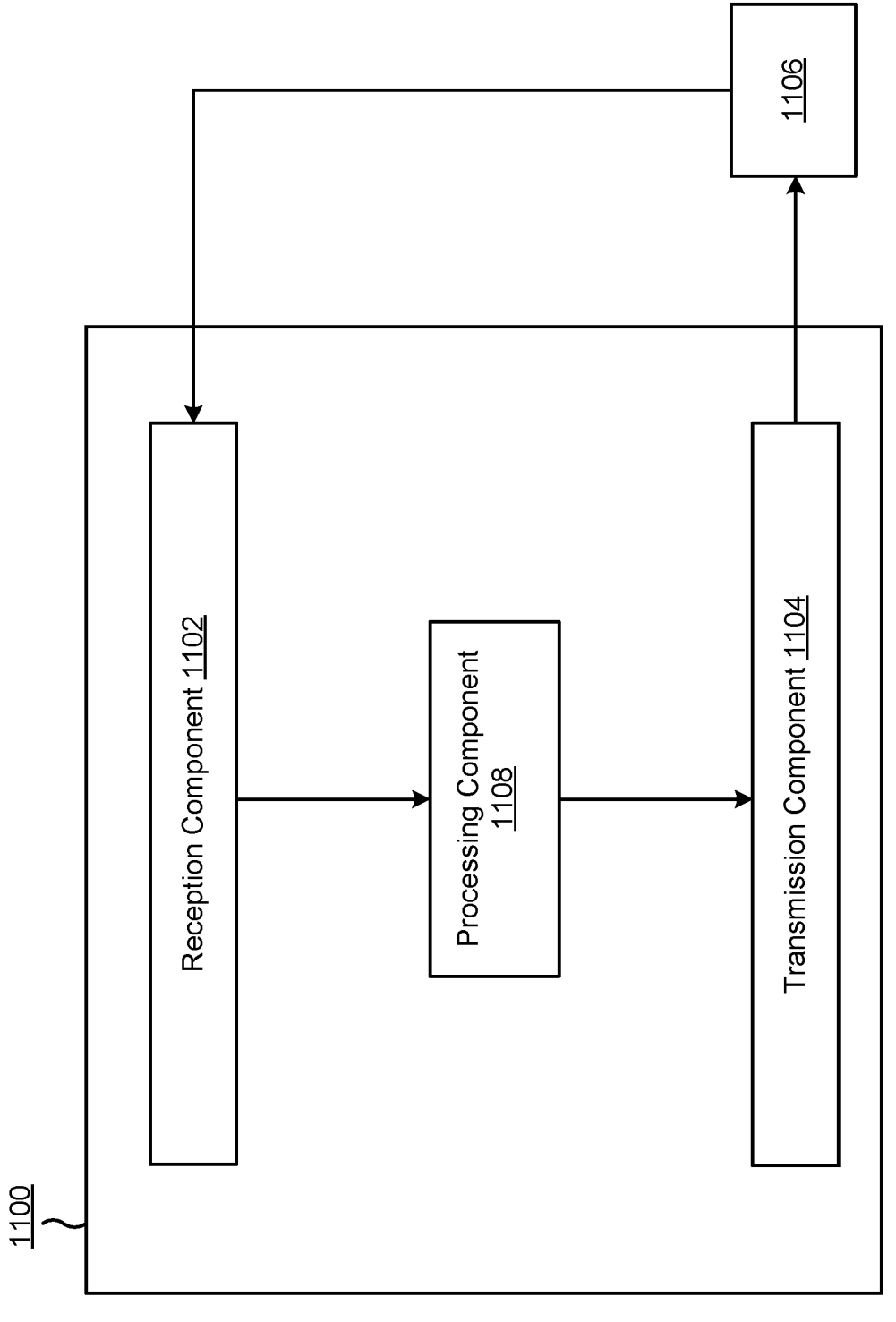
FIGS. 11 and 12 are block diagrams of example apparatuses for wireless communication, in accordance with the present disclosure.

FIG. 11 is a block diagram of an example apparatus 1100 for wireless communication. The apparatus 1100 may be a digital repeater, or a digital repeater may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a processing component 1108, among other examples.

In some aspects, the apparatus 1100 may be configured to perform one or more operations described herein in connection with FIGS. 4-8. Additionally or alternatively, the apparatus 1100 may be configured to perform one or more processes described herein, such as process 900 of FIG. 9. In some aspects, the apparatus 1100 and/or one or more components shown in FIG. 11 may include one or more components of the digital repeater described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the digital repeater described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the digital repeater described above in connection with FIG. 2. In some aspects, the transmission component 1104 may be co-located with the reception component 1102 in a transceiver.

The reception component 1102 may receive, using a control component of the digital repeater, a configuration that indicates a digital processing operation, wherein the control component receives the configuration from a control node via a wireless control interface. The reception component 1102 may receive a first signal. The processing component 1108 may perform, using a repeating component of the digital repeater, the digital processing operation on the first signal to generate a second signal, wherein the second signal comprises a re-generated version of the first signal. In some aspects, the processing component 1108 may include one or more antennas, a demodulator, a MIMO detector, a receive processor, a modulator, a transmit MIMO processor, a transmit processor, a controller/processor, a memory, or a combination thereof, of the digital repeater described above in connection with FIG. 2. The transmission component 1104 may transmit the second signal.

The transmission component 1104 may transmit, using the frequency, at least one control message to the control node, wherein the at least one control message indicates at least one of a configuration of the digital repeater, a capability of the digital repeater, or a status of the digital repeater.

The reception component 1102 and/or the transmission component 1104 may establish, using the control component and a frequency, an access link to the control node.

The reception component 1102 may receive a BWP configuration that indicates a BWP corresponding to the wireless control interface.

The reception component 1102 may receive, from the control node, a control message that indicates at least one of a reception beamforming configuration associated with the first signal, a reception time domain resource associated with the first signal, a transmission beamforming configuration associated with transmitting the second signal, or a transmission time domain resource associated with transmitting the second signal.

The transmission component 1104 may transmit a control message to the control node, wherein the control message indicates a beamforming capability of the digital repeater wherein the reception beamforming configuration is based at least in part on the beamforming capability.

The transmission component 1104 may transmit, using the control component, an additional control message to the control node, wherein the reference time domain resource corresponds to the additional control message.

The transmission component 1104 may transmit a control message to the control node, wherein the control message includes one or more IEs, the one or more IEs indicating at least one of an operation supported by the digital repeater, a beamforming codebook characteristic, a beamforming capability, a transmitter power configuration, a timing configuration, a buffer status, an ADC configuration, an ADC setting, a DAC configuration, a DAC setting, an IQ capability, or an IQ setting.

The transmission component 1104 may transmit a periodic report to the control node, wherein the periodic report indicates at least one of a capability of the digital repeater, or a configuration of the digital repeater.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
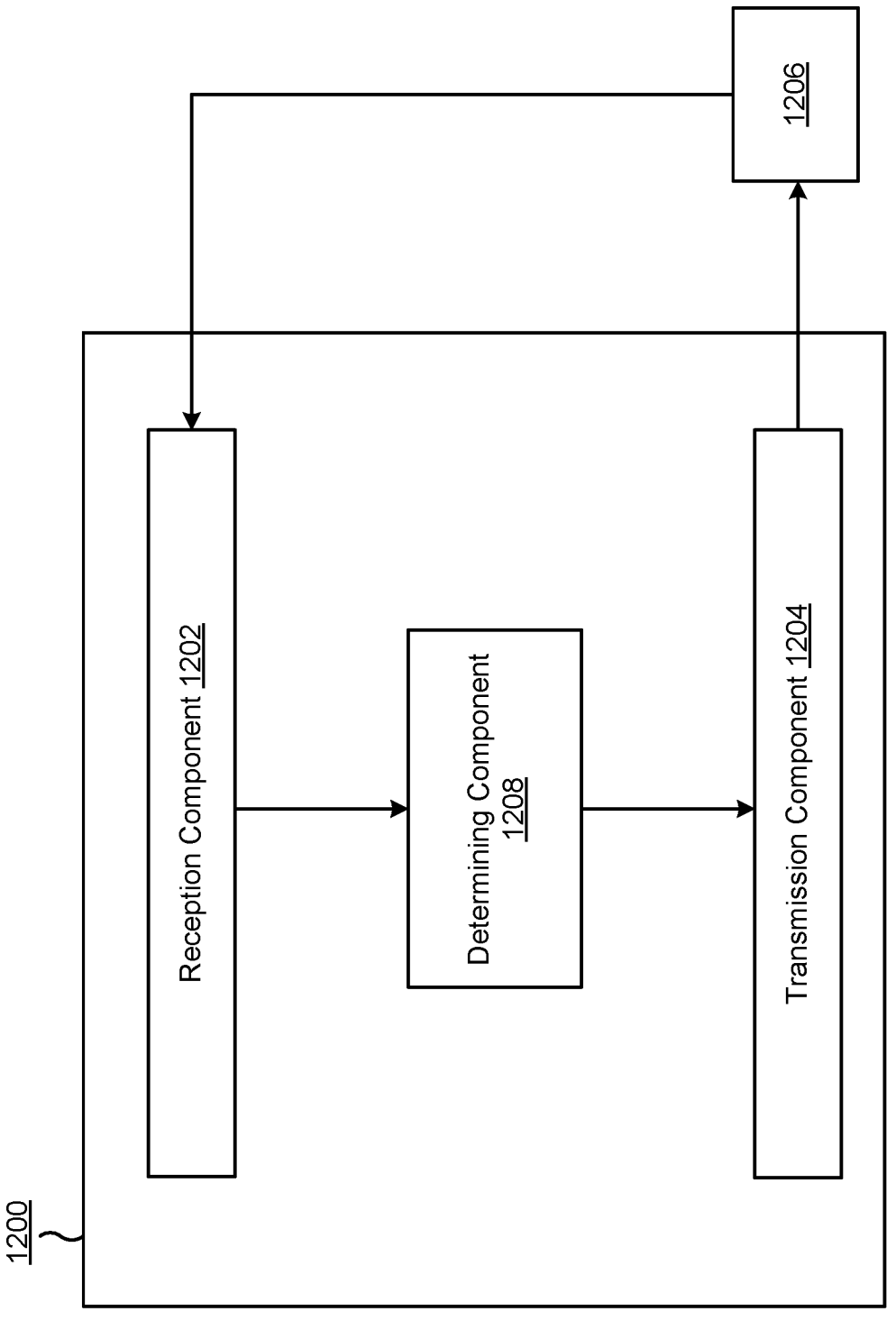

FIG. 12 is a block diagram of an example apparatus 1200 for wireless communication. The apparatus 1200 may be a control node, or a control node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determining component 1208, among other examples.

In some aspects, the apparatus 1200 may be configured to perform one or more operations described herein in connection with FIGS. 4-8. Additionally or alternatively, the apparatus 1200 may be configured to perform one or more processes described herein, such as process 1000 of FIG. 10. In some aspects, the apparatus 1200 and/or one or more components shown in FIG. 12 may include one or more components of the control node described above in connection with FIG. 2. Additionally, or alternatively, one or more components shown in FIG. 12 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the control node described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the control node described above in connection with FIG. 2. In some aspects, the transmission component 1204 may be co-located with the reception component 1202 in a transceiver.

The reception component 1202 may receive one or more control messages from a digital repeater via a wireless control interface. The one or more control messages may include a configuration of the digital repeater, a capability of the digital repeater, a status of the digital repeater, and/or the like. The determining component 1208 may determine, based at least in part on the configuration of the digital repeater, the capability of the digital repeater, the status of the digital repeater, and/or the like, the digital processing operation to be performed by the digital repeater on the first signal to generate a second signal. In some aspects, the determining component 1208 may include one or more antennas, a demodulator, a MIMO detector, a receive processor, a modulator, a transmit MIMO processor, a transmit processor, a controller/processor, a memory, or a combination thereof, of the control node described above in connection with FIG. 2.

The transmission component 1204 may transmit, to a control component of a digital repeater via a wireless control interface, a configuration for a repeating operation that facilitates forwarding a first signal from a first wireless node to a second wireless node, wherein the configuration indicates a digital processing operation for regenerating the first signal to create a second signal, wherein the digital processing operation comprises a digital processing option selected from a plurality of digital processing options. The reception component 1202 and/or the transmission component 1204 may communicate with a wireless node, via the digital repeater, based at least in part on the configuration.

The transmission component 1204 may transmit the first signal to the digital repeater, wherein the first signal is transmitted using a frequency.

The transmission component 1204 may transmit control messages to the digital repeater via the in-band control interface using the frequency.

The reception component 1202 and/or the transmission component 1204 may establish an access link with the control component of the control node.

The transmission component 1204 may transmit, to the digital repeater, a BWP configuration that indicates a BWP corresponding to the wireless control interface.

The transmission component 1204 may transmit the first signal using a first RAT and control messages via the control interface using a second RAT that is different than the first RAT.

The transmission component 1204 may transmit, to the digital repeater, a control message that indicates at least one of a reception beamforming configuration associated with the first signal, a reception time domain resource associated with the first signal, a transmission beamforming configuration associated with transmitting the second signal, or a transmission time domain resource associated with transmitting the second signal.

The reception component 1202 may receive a control message from the digital repeater, wherein the control message indicates a beamforming capability of the digital repeater wherein the reception beamforming configuration is based at least in part on the beamforming capability.

The reception component 1202 may receive, from the control component, an additional control message, wherein the reference time domain resource corresponds to the additional control message.

The reception component 1202 may receive a control message from the digital repeater, wherein the control message includes one or more IEs, the one or more IEs indicating at least one of an operation supported by the digital repeater, a beamforming codebook characteristic, a beamforming capability, a transmitter power configuration, a timing configuration, a buffer status, an ADC configuration, an ADC setting, a DAC configuration, a DAC setting, an IQ capability, or an IQ setting.

The reception component 1202 may receive a periodic report from the digital repeater, wherein the periodic report indicates at least one of a capability of the digital repeater or a configuration of the digital repeater.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a digital repeater, comprising: receiving, using a control component of the digital repeater, a configuration that indicates a digital processing operation, wherein the control component receives the configuration from a control node via a wireless control interface; receiving a first signal; performing, using a repeating component of the digital repeater, the digital processing operation on the first signal to generate a second signal, wherein the second signal comprises a re-generated version of the first signal; and transmitting the second signal.

Aspect 2: The method of Aspect 1, wherein receiving the first signal comprises receiving a millimeter wave wireless signal.

Aspect 3: The method of either of Aspects 1 or 2, wherein the configuration indicates a beamforming configuration for at least one of receiving the first signal or transmitting the second signal.

Aspect 4: The method of any of Aspects 1-3, wherein performing the digital processing operation comprises: obtaining a plurality of digital samples from the first signal; storing the plurality of digital samples; and extracting a plurality of tones from the plurality of digital samples.

Aspect 5: The method of any of Aspects 1-4, wherein the wireless control interface comprises an in-band control interface.

Aspect 6: The method of Aspect 5, wherein the first signal is received using a frequency, and wherein control messages are received via the in-band control interface using the frequency.

Aspect 7: The method of any of Aspects 1-6, further comprising transmitting at least one control message to the control node, wherein the at least one control message indicates at least one of: a configuration of the digital repeater, a capability of the digital repeater, or a status of the digital repeater.

Aspect 8: The method of any of Aspects 1-7, further comprising establishing, using the control component and a frequency, an access link to the control node.

Aspect 9: The method of any of Aspects 1-8, further comprising receiving a bandwidth part (BWP) configuration that indicates a BWP corresponding to the wireless control interface.

Aspect 10: The method of any of Aspects 1-9, wherein the configuration is carried by a control message comprising at least one of: downlink control information, a radio resource control message, or a medium access control (MAC) control element.

Aspect 11: The method of any of Aspects 1-10, wherein the configuration is carried in a front haul physical downlink control channel (FH-PDCCH) control message.

Aspect 12: The method of Aspect 11, wherein the FH-PDCCH control message comprises downlink control information scrambled by a front haul radio network temporary identifier (FH-RNTI), wherein the FH-RNTI is associated with the control component.

Aspect 13: The method of any of Aspects 1-4, wherein the wireless control interface comprises an out-of-band control interface.

Aspect 14: The method of Aspect 13, wherein the first signal is received using a first frequency, and wherein control messages are received via the control interface using a second frequency that is different than the first frequency.

Aspect 15: The method of Aspect 14, wherein the second frequency is lower than the first frequency.

Aspect 16: The method of any of Aspects 1-15, wherein the control component is based at least in part on a Long Term Evolution narrow band Internet-of-Things user equipment.

Aspect 17: The method of any of Aspects 1-16, wherein the control component is based at least in part on a New Radio sub-6 reduced capability user equipment.

Aspect 18: The method of any of Aspects 1-17, wherein the control component is based on a user equipment (UE) specification that specifies a plurality of functions supported by the UE, and wherein the control component does not support all of the plurality of functions.

Aspect 19: The method of any of Aspects 1-18, wherein the first signal is received using a first radio access technology (RAT), and wherein control messages are received via the control interface using a second RAT that is different than the first RAT.

Aspect 20: The method of any of Aspects 1-19, wherein the configuration is carried in a control message comprising at least one of: a lower-layer control message, an upper-layer control message, or an application-layer control message.

Aspect 21: The method of any of Aspects 1-20, further comprising receiving, from the control node, a control message that indicates at least one of: a reception beamforming configuration associated with the first signal, a reception time domain resource associated with the first signal, a transmission beamforming configuration associated with transmitting the second signal, or a transmission time domain resource associated with transmitting the second signal.

Aspect 22: The method of Aspect 21, wherein the reception beamforming configuration indicates an index associated with a beamforming codebook.

Aspect 23: The method of either of Aspects 21 or 22, wherein the reception beamforming configuration indicates at least one of: a phase setting of an antenna element of the digital repeater, or an amplitude setting of the antenna element of the digital repeater.

Aspect 24: The method of any of Aspects 21-23, further comprising transmitting a control message to the control node, wherein the control message indicates a beamforming capability of the digital repeater, wherein the reception beamforming configuration is based at least in part on the beamforming capability.

Aspect 25: The method of any of Aspects 21-24, wherein the transmission time domain resource is indicated relative to the reception time domain resource.

Aspect 26: The method of any of Aspects 21-25, wherein the transmission time domain resource is based at least in part on a synchronization characteristic corresponding to a synchronization mode between the digital repeater and the control node.

Aspect 27: The method of Aspect 26, wherein the synchronization characteristic indicates a synchronous mode between the digital repeater and the control node, and wherein the transmission time domain resource is based at least in part on an indication of the reception time domain resource, wherein the indication of the reception time domain resource indicates at least one of: a symbol identifier, a slot identifier, or a frame identifier.

Aspect 28: The method of Aspect 26, wherein the synchronization characteristic indicates an asynchronous mode between the digital repeater and the control node, and wherein the transmission time domain resource is based at least in part on an indication of a reference time domain resource, wherein the indication of the reference time domain resource indicates at least one of: a symbol identifier, a slot identifier, or a frame identifier.

Aspect 29: The method of Aspect 28, further comprising transmitting, using the control component, an additional control message to the control node, wherein the reference time domain resource corresponds to the additional control message.

Aspect 30: The method of Aspect 26, wherein the synchronization characteristic indicates an out-of-sync synchronization mode between the digital repeater and the control node, and wherein the transmission time domain resource is based at least in part on a reference time domain resource, wherein the reference time domain resource corresponds to the configuration.

Aspect 31: The method of any of Aspects 1-30, further comprising transmitting a control message to the control node, wherein the control message includes one or more information elements (IEs), the one or more IEs indicating at least one of: an operation supported by the digital repeater, a beamforming codebook characteristic, a beamforming capability, a transmitter power configuration, a timing configuration, a buffer status, an analog-to-digital converter (ADC) configuration, an ADC setting, a digital-to-analog converter (DAC) configuration, a DAC setting, an in-phase and quadrature (IQ) sample compression capability, an IQ sample decompression capability, an IQ sample compression setting, or an IQ sample decompression setting.

Aspect 32: The method of Aspect 31, wherein the beamforming codebook characteristic indicates at least one of: a number of transmitter beams available, a number of receiver beams available, a spatial quasi co-location characteristic associated with a beam, a number of antenna arrays, a number of antenna panels, an association between a beam and an antenna array, or an association between a beam and an antenna panel.

Aspect 33: The method of either of Aspects 31 or 32, wherein the transmitter power configuration indicates at least one of: a power headroom, a maximum transmitter power, a maximum gain level, a current gain setting, or a current transmitter power.

Aspect 34: The method of any of Aspects 31-33, wherein the timing configuration indicates at least one of: a level of synchronization between the digital repeater and the control node, a synchronous operation supported by the digital repeater, or an asynchronous operation supported by the digital repeater.

Aspect 35: The method of any of Aspects 31-34, wherein the buffer status indicates at least one of: an available memory, a maximum buffer size, or a buffer overflow.

Aspect 36: The method of any of Aspects 1-35, wherein the first signal comprises at least one of: a physical downlink control channel transmission, a physical downlink shared channel transmission, a physical uplink control channel transmission, a physical uplink shared channel transmission, or an acknowledgement or negative acknowledgement feedback message.

Aspect 37: The method of any of Aspects 1-36, wherein the digital processing operation comprises a digital processing option selected from a plurality of digital processing options.

Aspect 38: The method of Aspect 37, wherein the digital processing option is based at least in part on at least one of: time domain in-phase and quadrature (IQ) sample buffering, tone extraction, resource element extraction, channel estimation and equalization, or decoding the first signal.

Aspect 39: The method of any of Aspects 1-38, wherein the configuration comprises at least one control information element (IE), the at least one control IE indicating: a reception configuration, a buffering configuration, a forwarding configuration, or an information request.

Aspect 40: The method of Aspect 39, wherein the reception configuration indicates at least one of: a reception analog beamforming configuration, a time domain resource associated with the first signal, a frequency domain resource associated with the first signal, a numerology associated with the first signal, a digital receiver beamforming configuration, resource element (RE) mapping information associated with the first signal, a channel estimation configuration, a scrambling identifier associated with the first signal, or a coding configuration associated with the first signal.

Aspect 41: The method of Aspect 40, wherein the frequency domain resource associated with the first signal comprises at least one of: a center frequency, a bandwidth, or a bandwidth part.

Aspect 42: The method of either of Aspects 40 or 41, wherein the numerology associated with the first signal comprises at least one of: a cyclic prefix size, a subcarrier spacing, or a fast Fourier transform size.

Aspect 43: The method of any of Aspects 40-42, wherein the RE mapping information associated with the first signal comprises a plurality of indices corresponding to a plurality of occupied tones associated with the first signal.

Aspect 44: The method of any of Aspects 40-43, wherein the channel estimation configuration indicates at least one of: a resource associated with a reference signal, or a configuration associated with the reference signal.

Aspect 45: The method of any of Aspects 40-44, wherein the coding configuration indicates at least one of: a modulation and coding scheme, or a coding technique.

Aspect 46: The method of any of Aspects 39-45, wherein the buffering configuration indicates at least one of: an analog-to-digital converter (ADC) setting, a digital-to-analog converter (DAC) setting, an IQ sample compression setting, or an IQ sample decompression setting.

Aspect 47: The method of Aspect 46, wherein the ADC setting comprises at least one of: an ADC resolution, or a sample rate.

Aspect 48: The method of any of Aspects 39-47, wherein the forwarding configuration comprises at least one of: a transmission beamforming configuration, a time domain resource associated with transmitting the second signal, a transmission power setting, a transmission amplification setting, a transmission center frequency, a numerology associated with transmitting the second signal, a digital transmitter beamforming configuration, resource element (RE) mapping information associated with transmitting the second signal, a layer mapping configuration, a precoding configuration, a scrambling identifier associated with transmitting the second signal, or a coding configuration associated with transmitting the second signal.

Aspect 49: The method of Aspect 48, wherein the numerology associated with forwarding the first signal comprises at least one of: a cyclic prefix size, a subcarrier spacing, or a fast Fourier transform size.

Aspect 50: The method of either of Aspects 48 or 49, wherein the RE mapping information associated with forwarding the first signal comprises a plurality of indices corresponding to a plurality of occupied tones associated with transmitting the second signal.

Aspect 51: The method of any of Aspects 39-50, wherein the information request comprises a request for at least one of: a buffer status, a power status, a measurement report, a capability of the digital repeater, or a configuration of the digital repeater.

Aspect 52: The method of Aspect 51, wherein the request for the power status comprises a request for a power headroom of the digital repeater.

Aspect 53: The method of either of Aspects 51 or 52, wherein the request for the measurement report comprises a request for a signal quality measurement.

Aspect 54: The method of any of Aspects 1-53, further comprising transmitting a periodic report to the control node, wherein the periodic report indicates at least one of: a capability of the digital repeater, or a configuration of the digital repeater.

Aspect 55: A method of wireless communication performed by a control node, comprising: determining a configuration for a repeating operation that facilitates forwarding a first signal from a first wireless node to a second wireless node, wherein the configuration indicates a digital processing operation for regenerating the first signal to create a second signal, wherein the digital processing operation comprises a digital processing option selected from a plurality of digital processing options; and transmitting the configuration to a control component of a digital repeater via a wireless control interface.

Aspect 56: The method of Aspect 55, wherein the first signal comprises a millimeter wave wireless signal.

Aspect 57: The method of either of Aspects 55 or 56, wherein the configuration indicates a beamforming configuration for at least one of receiving the first signal or transmitting the second signal.

Aspect 58: The method of any of Aspects 55-57, wherein the digital processing operation is configured to facilitate extraction of a plurality of tones from the first signal.

Aspect 59: The method of any of Aspects 55-58, wherein the wireless control interface comprises an in-band control interface.

Aspect 60: The method of any of Aspects 55-59, further comprising receiving at least one control message from the digital repeater, wherein the at least one control message indicates at least one of: a configuration of the digital repeater, a capability of the digital repeater, or a status of the digital repeater.

Aspect 61: The method of any of Aspects 55-60, further comprising establishing an access link with the control component of the control node.

Aspect 62: The method of any of Aspects 55-61, further comprising transmitting, to the digital repeater, a bandwidth part (BWP) configuration that indicates a BWP corresponding to the wireless control interface.

Aspect 63: The method of any of Aspects 55-62, wherein the configuration is carried by a control message comprising at least one of: downlink control information, a radio resource control message, or a medium access control (MAC) control element.

Aspect 64: The method of any of Aspects 55-63, wherein the configuration is carried in a front haul physical downlink control channel (FH-PDCCH) control message.

Aspect 65: The method of Aspect 64, wherein the FH-PDCCH control message comprises downlink control information scrambled by a front haul radio network temporary identifier (FH-RNTI), wherein the FH-RNTI is associated with the control component.

Aspect 66: The method of any of Aspects 55-58, wherein the wireless control interface comprises an out-of-band control interface.

Aspect 67: The method of any of Aspects 55-66, wherein the control component is based at least in part on a Long Term Evolution narrow band Internet-of-Things user equipment.

Aspect 68: The method of any of Aspects 55-67, wherein the control component is based at least in part on a New Radio sub-6 reduced capability user equipment.

Aspect 69: The method of any of Aspects 55-68, wherein the control component is based on a user equipment (UE) specification that specifies a plurality of functions supported by the UE, and wherein the control component does not support all of the plurality of functions.

Aspect 70: The method of any of Aspects 55-69, wherein the configuration is carried in a control message comprising at least one of: a lower-layer control message, an upper-layer control message, or an application-layer control message.

Aspect 71: The method of any of Aspects 55-70, further comprising transmitting, to the digital repeater, a control message that indicates at least one of: a reception beamforming configuration associated with the first signal, a reception time domain resource associated with the first signal, a transmission beamforming configuration associated with transmitting the second signal, or a transmission time domain resource associated with transmitting the second signal.

Aspect 72: The method of Aspect 71, wherein the reception beamforming configuration indicates an index associated with a beamforming codebook.

Aspect 73: The method of either of Aspects 71 or 72, wherein the reception beamforming configuration indicates at least one of: a phase setting of an antenna element of the digital repeater, or an amplitude setting of the antenna element of the digital repeater.

Aspect 74: The method of any of Aspects 55-73, further comprising receiving a control message from the digital repeater, wherein the control message indicates a beamforming capability of the digital repeater, wherein the reception beamforming configuration is based at least in part on the beamforming capability.

Aspect 75: The method of any of Aspects 71-74, wherein the transmission time domain resource is indicated relative to the reception time domain resource.

Aspect 76: The method of any of Aspects 71-75, wherein the transmission time domain resource is based at least in part on a synchronization characteristic corresponding to a synchronization mode between the digital repeater and the control node.

Aspect 77: The method of Aspect 76, wherein the synchronization characteristic indicates a synchronous mode between the digital repeater and the control node, and wherein the transmission time domain resource is based at least in part on an indication of the reception time domain resource, wherein the indication of the reception time domain resource indicates at least one of: a symbol identifier, a slot identifier, or a frame identifier.

Aspect 78: The method of Aspect 76, wherein the synchronization characteristic indicates an asynchronous mode between the digital repeater and the control node, and wherein the transmission time domain resource is based at least in part on an indication of a reference time domain resource, wherein the indication of the reference time domain resource indicates at least one of: a symbol identifier, a slot identifier, or a frame identifier.

Aspect 79: The method of Aspect 78, further comprising receiving, from the control component, an additional control message, wherein the reference time domain resource corresponds to the additional control message.

Aspect 80: The method of Aspect 76, wherein the synchronization characteristic indicates an out-of-sync synchronization mode between the digital repeater and the control node, and wherein the transmission time domain resource is based at least in part on a reference time domain resource, wherein the reference time domain resource corresponds to the configuration.

Aspect 81: The method of any of Aspects 55-80, further comprising receiving a control message from the digital repeater, wherein the control message includes one or more information elements (IEs), the one or more IEs indicating at least one of: an operation supported by the digital repeater, a beamforming codebook characteristic, a beamforming capability, a transmitter power configuration, a timing configuration, a buffer status, an analog-to-digital converter (ADC) configuration, an ADC setting, a digital-to-analog converter (DAC) configuration, a DAC setting, an in-phase and quadrature (IQ) sample compression capability, an IQ sample decompression capability, an IQ sample compression setting, or an IQ sample decompression setting.

Aspect 82: The method of Aspect 81, wherein the beamforming codebook characteristic indicates at least one of: a number of transmitter beams available, a number of receiver beams available, a spatial quasi co-location characteristic associated with a beam, a number of antenna arrays, a number of antenna panels, an association between a beam and an antenna array, or an association between a beam and an antenna panel.

Aspect 83: The method of either of Aspects 81 or 82, wherein the transmitter power configuration indicates at least one of: a power headroom, a maximum transmitter power, a maximum gain level, a current gain setting, or a current transmitter power.

Aspect 84: The method of any of Aspects 81-83, wherein the timing configuration indicates at least one of: a level of synchronization between the digital repeater and the control node, a synchronous operation supported by the digital repeater, or an asynchronous operation supported by the digital repeater.

Aspect 85: The method of any of Aspects 81-84, wherein the buffer status indicates at least one of: an available memory, a maximum buffer size, or a buffer overflow.

Aspect 86: The method of any of Aspects 55-85, wherein the first signal comprises at least one of: a physical downlink control channel transmission, a physical downlink shared channel transmission, a physical uplink control channel transmission, a physical uplink shared channel transmission, or an acknowledgement or negative acknowledgement feedback message.

Aspect 87: The method of any of Aspects 55-86, wherein the digital processing operation comprises a digital processing option selected from a plurality of digital processing options.

Aspect 88: The method of Aspect 87, wherein the digital processing option is based at least in part on at least one of: time domain in-phase and quadrature (IQ) sample buffering, tone extraction, resource element extraction, channel estimation and equalization, or decoding the first signal.

Aspect 89: The method of any of Aspects 55-88, wherein the configuration comprises at least one control information element (IE), the at least one control IE indicating: a reception configuration, a buffering configuration, a forwarding configuration, or an information request.

Aspect 90: The method of Aspect 89, wherein the reception configuration indicates at least one of: a reception analog beamforming configuration, a time domain resource associated with the first signal, a frequency domain resource associated with the first signal, a numerology associated with the first signal, a digital receiver beamforming configuration, resource element (RE) mapping information associated with the first signal, a channel estimation configuration, a scrambling identifier associated with the first signal, or a coding configuration associated with the first signal.

Aspect 91: The method of Aspect 90, wherein the frequency domain resource associated with the first signal comprises at least one of: a center frequency, a bandwidth, or a bandwidth part.

Aspect 92: The method of either of Aspects 90 or 91, wherein the numerology associated with the first signal comprises at least one of: a cyclic prefix size, a subcarrier spacing, or a fast Fourier transform size.

Aspect 93: The method of any of Aspects 90-92, wherein the RE mapping information associated with the first signal comprises a plurality of indices corresponding to a plurality of occupied tones associated with the first signal.

Aspect 94: The method of any of Aspects 90-93, wherein the channel estimation configuration indicates at least one of: a resource associated with a reference signal, or a configuration associated with the reference signal.

Aspect 95: The method of any of Aspects 90-94, wherein the coding configuration indicates at least one of: a modulation and coding scheme, or a coding technique.

Aspect 96: The method of any of Aspects 90-95, wherein the buffering configuration indicates at least one of: an analog-to-digital converter (ADC) setting, a digital-to-analog converter (DAC) setting, an IQ sample compression setting, or an IQ sample decompression setting.

Aspect 97: The method of Aspect 96, wherein the ADC setting comprises at least one of: an ADC resolution, or a sample rate.

Aspect 98: The method of any of Aspects 90-97, wherein the forwarding configuration comprises at least one of: a transmission beamforming configuration, a time domain resource associated with transmitting the second signal, a transmission power setting, a transmission amplification setting, a transmission center frequency, a numerology associated with transmitting the second signal, a digital transmitter beamforming configuration, resource element (RE) mapping information associated with transmitting the second signal, a layer mapping configuration, a precoding configuration, a scrambling identifier associated with transmitting the second signal, or a coding configuration associated with transmitting the second signal.

Aspect 99: The method of Aspect 98, wherein the numerology associated with forwarding the first signal comprises at least one of: a cyclic prefix size, a subcarrier spacing, or a fast Fourier transform size.

Aspect 100: The method of either of Aspects 98 or 99, wherein the RE mapping information associated with forwarding the first signal comprises a plurality of indices corresponding to a plurality of occupied tones associated with transmitting the second signal.

Aspect 101: The method of any of Aspects 90-100, wherein the information request comprises a request for at least one of: a buffer status, a power status, a measurement report, a capability of the digital repeater, or a configuration of the digital repeater.

Aspect 102: The method of Aspect 101, wherein the request for the power status comprises a request for a power headroom of the digital repeater.

Aspect 103: The method of either of Aspects 101 or 102, wherein the request for the measurement report comprises a request for a signal quality measurement.

Aspect 104: The method of any of Aspects 55-103, further comprising receiving a periodic report from the digital repeater, wherein the periodic report indicates at least one of: a capability of the digital repeater, or a configuration of the digital repeater.

Aspect 105: The method of any of Aspects 55-104, further comprising communicating with a wireless node, via the digital repeater, based at least in part on the configuration.

Aspect 106: An apparatus for wireless communication at a device, comprising a processor; memory coupled with the processor; and instructions stored in the memory and executable by the processor to cause the apparatus to perform the method of one or more of Aspects 1-54.

Aspect 107: A device for wireless communication, comprising a memory and one or more processors coupled to the memory, the one or more processors configured to perform the method of one or more of Aspects 1-54.

Aspect 108: An apparatus for wireless communication, comprising at least one means for performing the method of one or more of Aspects 1-54.

Aspect 109: A non-transitory computer-readable medium storing code for wireless communication, the code comprising instructions executable by a processor to perform the method of one or more of Aspects 1-54.

Aspect 110: A non-transitory computer-readable medium storing a set of instructions for wireless communication, the set of instructions comprising one or more instructions that, when executed by one or more processors of a device, cause the device to perform the method of one or more of Aspects 1-54.

Aspect 111: An apparatus for wireless communication at a device, comprising a processor; memory coupled with the processor; and instructions stored in the memory and executable by the processor to cause the apparatus to perform the method of one or more of Aspects 55-105.

Aspect 112: A device for wireless communication, comprising a memory and one or more processors coupled to the memory, the one or more processors configured to perform the method of one or more of Aspects 55-105.

Aspect 113: An apparatus for wireless communication, comprising at least one means for performing the method of one or more of Aspects 55-105.

Aspect 114: A non-transitory computer-readable medium storing code for wireless communication, the code comprising instructions executable by a processor to perform the method of one or more of Aspects 55-105.

Aspect 115: A non-transitory computer-readable medium storing a set of instructions for wireless communication, the set of instructions comprising one or more instructions that, when executed by one or more processors of a device, cause the device to perform the method of one or more of Aspects 55-105.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a digital repeater, comprising:

transmitting, using a control component of the digital repeater, at least one first control message to a control node, wherein the at least one first control message indicates a capability of the digital repeater, and wherein the at least one first control message is transmitted via an out-of-band control interface using a first range of frequencies;

receiving, using the control component and based on transmitting the at least one first control message, at least one second control message that comprises a configuration that indicates a digital processing operation to be performed by a repeating component of the digital repeater, wherein the at least one second control message indicates a transmission time domain resource associated with transmitting a second signal, wherein the transmission time domain resource is based at least in part on a synchronization characteristic corresponding to a synchronization mode between the digital repeater and the control node, wherein the control component receives the at least one second control message directly from the control node via the out-of-band control interface using the first range of frequencies, and wherein the digital processing operation includes a digital processing option of a plurality of digital processing options;

receiving a first signal from a first wireless node using a second range of frequencies, wherein the control node and the first wireless node are different, and wherein the first range of frequencies is different from the second range of frequencies;

performing, using the repeating component of the digital repeater, the digital processing operation on the first signal to generate the second signal, wherein the digital processing operation includes obtaining a plurality of digital samples from the first signal based on converting the first signal from an analog domain to a digital domain, and wherein the second signal comprises a re-generated version of the first signal; and transmitting the second signal to a second wireless node, wherein the control node and the second wireless node are different.

2. The method of claim 1, wherein the configuration indicates a beamforming configuration for at least one of receiving the first signal or transmitting the second signal.

3. The method of claim 1, wherein the at least one first control message further indicates at least one of:

a configuration of the digital repeater, or a status of the digital repeater.

4. The method of claim 1, further comprising establishing, using the control component and a frequency, an access link to the control node.

5. The method of claim 1, further comprising receiving a bandwidth part (BWP) configuration that indicates a BWP corresponding to the out-of-band control interface.

6. The method of claim 1, wherein the at least one second control message further comprises at least one of:

downlink control information, a radio resource control message, or a medium access control (MAC) control element.

7. The method of claim 1, wherein the at least one second control message includes a front haul physical downlink control channel (FH-PDCCH) control message.

8. The method of claim 1, wherein the control component is based at least in part on at least one of a Long Term Evolution narrow band Internet-of-Things user equipment or a New Radio sub-6 reduced capability user equipment.

9. The method of claim 1, wherein the control component is based on a user equipment (UE) specification that specifies a plurality of functions supported by the UE, and wherein the control component does not support all of the plurality of functions.

10. The method of claim 1, wherein the first signal is received using a first radio access technology (RAT), and wherein the at least one second control message is received using a second RAT that is different than the first RAT.

11. The method of claim 1, wherein the at least one second control message comprises at least one of:

a lower-layer control message, an upper-layer control message, or an application-layer control message.

12. The method of claim 1, wherein the at least one second control message further indicates at least one of:

a reception beamforming configuration associated with the first signal, a reception time domain resource associated with the first signal, or a transmission beamforming configuration associated with transmitting the second signal.

13. The method of claim 12, wherein the at least one first control message further indicates a beamforming capability of the digital repeater, wherein the reception beamforming configuration is based at least in part on the beamforming capability.

14. The method of claim 12, wherein the transmission time domain resource is indicated relative to the reception time domain resource.

15. The method of claim 1, wherein the synchronization characteristic indicates a synchronous mode between the digital repeater and the control node, and wherein the transmission time domain resource is based at least in part on an indication of a reception time domain resource associated with the first signal, wherein the indication of the reception time domain resource indicates at least one of:

a symbol identifier, a slot identifier, or a frame identifier.

16. The method of claim 1, wherein the synchronization characteristic indicates an asynchronous mode between the digital repeater and the control node, and wherein the transmission time domain resource is based at least in part on an indication of a reference time domain resource associated with the first signal, wherein the indication of the reference time domain resource indicates at least one of:

a symbol identifier, a slot identifier, or a frame identifier.

17. The method of claim 1, wherein the synchronization characteristic indicates an out-of-sync synchronization mode between the digital repeater and the control node, and wherein the transmission time domain resource is based at least in part on a reference time domain resource associated with the first signal, wherein the reference time domain resource corresponds to the configuration.

18. The method of claim 1, wherein the at least one first control message includes one or more information elements (IEs), the one or more IEs indicating at least one of:

an operation supported by the digital repeater, a beamforming codebook characteristic, a beamforming capability, a transmitter power configuration, a timing configuration, a buffer status, an analog-to-digital converter (ADC) configuration, an ADC setting, a digital-to-analog converter (DAC) configuration, a DAC setting, an in-phase and quadrature (IQ) sample compression capability, an IQ sample decompression capability, an IQ sample compression setting, or an IQ sample decompression setting.

19. The method of claim 18, wherein the timing configuration indicates at least one of:

a level of synchronization between the digital repeater and the control node, a synchronous operation supported by the digital repeater, or an asynchronous operation supported by the digital repeater.

20. The method of claim 1, wherein the configuration comprises at least one control information element (IE), the at least one control IE indicating:

a reception configuration, a buffering configuration, a forwarding configuration, or an information request.

21. The method of claim 1, further comprising:

receiving an information request comprising a request for at least one of:

a buffer status, a power status, a measurement report, the capability of the digital repeater, or a configuration of the digital repeater.

22. The method of claim 21, wherein the request for the power status comprises a request for a power headroom of the digital repeater.

23. The method of claim 21, wherein the request for the measurement report comprises a request for a signal quality measurement.

24. The method of claim 1, further comprising transmitting a periodic report to the control node, wherein the periodic report indicates at least one of:

the capability of the digital repeater, or a configuration of the digital repeater.

25. A method of wireless communication performed by a control node, comprising:

receiving at least one first control message from a control component of a digital repeater, wherein the at least one first control message indicates a capability of the digital repeater, and wherein the at least one first control message is received via an out-of-band control interface using a first range of frequencies;

determining, based on receiving the at least one first control message, a configuration for a repeating operation that facilitates forwarding a first signal from a first wireless node to a second wireless node, wherein the configuration indicates a digital processing operation to be performed at a repeating component of the digital repeater for regenerating the first signal to create a second signal, wherein the digital processing operation comprises a digital processing option selected from a plurality of digital processing options, wherein the digital processing operation includes obtaining a plurality of digital samples from the first signal based on converting the first signal from an analog domain to a digital domain, and wherein the first wireless node and the control node are different; and transmitting, via the out-of-band control interface using the first range of frequencies, at least one second control message that comprises the configuration to the control component of the digital repeater, wherein the at least one second control message indicates a transmission time domain resource associated with the second signal, wherein the transmission time domain resource is based at least in part on a synchronization characteristic corresponding to a synchronization mode between the digital repeater and the control node, wherein the first range of frequencies is different from a second range of frequencies used for the first signal, and wherein the control node and the second wireless node are different.

26. A digital repeater for wireless communication, comprising:

one or more memories; and one or more processors, coupled to the one or more memories, configured to:

transmit, using a control component of the digital repeater and via an out-of-band control interface using a first range of frequencies, at least one first control message to a control node, wherein the at least one first control message indicates a capability of the digital repeater;

receive, using the control component and based on a transmission of the at least one first control message, at least one second control message that comprises a configuration that indicates a digital processing operation to be performed by a repeating component of the digital repeater, wherein the at least one second control message indicates a transmission time domain resource associated with a second signal, wherein the transmission time domain resource is based at least in part on a synchronization characteristic corresponding to a synchronization mode between the digital repeater and the control node, wherein the control component is configured to receive the at least one second control message directly from the control node via the out-of-band control interface using the first range of frequencies, and wherein the digital processing operation includes a digital processing option of a plurality of digital processing options;

receive a first signal from a first wireless node using a second range of frequencies, wherein the control node and the first wireless node are different, and wherein the first range of frequencies is different from the second range of frequencies;

perform, using the repeating component of the digital repeater, the digital processing operation on the first signal to generate the second signal, wherein, to perform the digital processing operation, the one or more processors are configured to obtain a plurality of digital samples from the first signal based on a conversion of the first signal from an analog domain to a digital domain, and wherein the second signal comprises a re-generated version of the first signal; and transmit the second signal to a second wireless node, wherein the control node and the second wireless node are different.

27. A control node for wireless communication, comprising:

one or more memories; and one or more processors, coupled to the one or more memories, configured to:

receive at least one first control message from a control component of a digital repeater, wherein the at least one first control message indicates a capability of the digital repeater, and wherein the at least one first control message is received via an out-of-band control interface using a first range of frequencies;

determine, based on receiving the at least one first control message, a configuration for a repeating operation that facilitates forwarding a first signal from a first wireless node to a second wireless node, wherein the configuration indicates a digital processing operation to be performed at a repeating component of the digital repeater for regenerating the first signal to create a second signal, wherein the digital processing operation comprises a digital processing option selected from a plurality of digital processing options, wherein the digital processing operation includes obtaining a plurality of digital samples from the first signal based on converting the first signal from an analog domain to a digital domain, and wherein the first wireless node and the control node are different; and transmit, via the out-of-band control interface using the first range of frequencies, at least one second control message that comprises the configuration to the control component of the digital repeater, wherein the at least one second control message indicates a transmission time domain resource associated with the second signal, wherein the transmission time domain resource is based at least in part on a synchronization characteristic corresponding to a synchronization mode between the digital repeater and the control node, wherein the first range of frequencies is different from a second range of frequencies used for the first signal, and wherein the control node and the second wireless node are different.

28. The method of claim 1, wherein performing the digital processing operation comprises extracting time domain in-phase and quadrature (IQ) samples based on converting the first signal from the analog domain to the digital domain.

29. The digital repeater of claim 26, wherein the configuration indicates a beamforming configuration for at least one of receiving the first signal or transmitting the second signal.

30. The digital repeater of claim 26, wherein the synchronization characteristic indicates a synchronous mode between the digital repeater and the control node, and wherein the transmission time domain resource is based at least in part on an indication of a reception time domain resource associated with the first signal, wherein the indication of the reception time domain resource indicates at least one of:

a symbol identifier, a slot identifier, or a frame identifier.

* * * * *